United States Patent [19]
Katsumata et al.

[11] Patent Number: 4,916,547
[45] Date of Patent: Apr. 10, 1990

[54] COLOR IMAGE FORMING APPARATUS

[75] Inventors: Akio Katsumata, Yokohama; Mitsuo Hasebe, Tokyo; Yoshihiro Mitekura, Tokyo; Hiroshi Hosaka, Tokyo; Itaru Matsuda; Kotaro Yonenaga, both of Yokohama; Takayuki Maruta; Masaaki Kogure, both of Tokyo, all of Japan

[73] Assignee: Ricoh Company, Ltd., Tokyo, Japan

[21] Appl. No.: 198,855

[22] Filed: May 26, 1988

[30] Foreign Application Priority Data

May 26, 1987 [JP] Japan ................................. 62-127020

[51] Int. Cl.[4] ..................... G01D 15/06; G03G 15/01; H04N 1/29; H04N 1/46
[52] U.S. Cl. ..................................... 358/300; 346/157
[58] Field of Search .................. 358/300, 75; 346/157, 346/139 A; 355/4

[56] References Cited
FOREIGN PATENT DOCUMENTS
0050481 4/1982 Japan ...................................... 358/75

Primary Examiner—Teresa J. Walberg
Assistant Examiner—Scott A. Rogers
Attorney, Agent, or Firm—Oblon, Spivak, McClelland, Maier & Neustadt

[57] ABSTRACT

An image forming apparatus of the type producing a single composite color image on a paper which is transported by a belt by transferring image components of different colors to the paper in register with each other. The apparatus reduces with a simple construction the positional deviation of the image components which occurs in an intended direction of paper transport. Recording devices individually adapted for black, cyan, magenta and yellow are arranged side by side. Pattern images for measurement each being associated with a respective one of those colors are formed on the belt. A timing at which each of the pattern images arrives is sensed and counted. The count is compared with a reference value to calculate an amount of deviation. Write start timing signals each being associated with a particular color are generated which are individually variable on the basis of the deviation calculated. The pattern images of the respective colors are each generated by using a write start timing associated with the color as a reference, and the pattern to be provided by any of the recording devices is outputted on a downstream side of the belt relative to the pattern to be provided by another recording device which is located downstream of the first-mentioned recording device.

8 Claims, 32 Drawing Sheets

Fig.11A
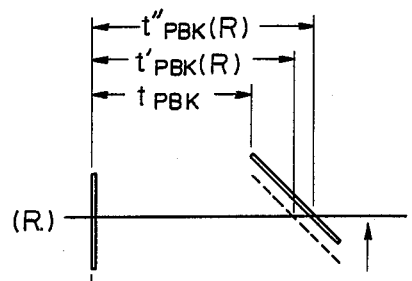
Fig.11B
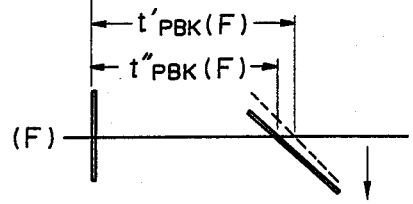
Fig.11C
Fig.11D
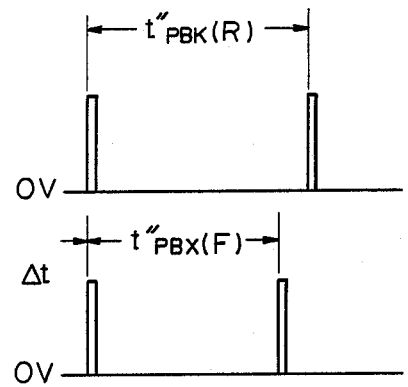
Fig.11E
Fig.11F
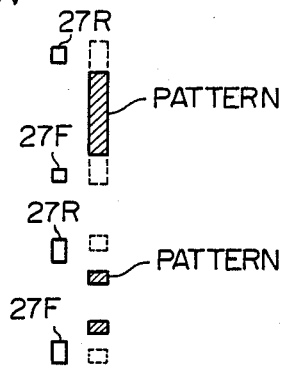

Fig. 12
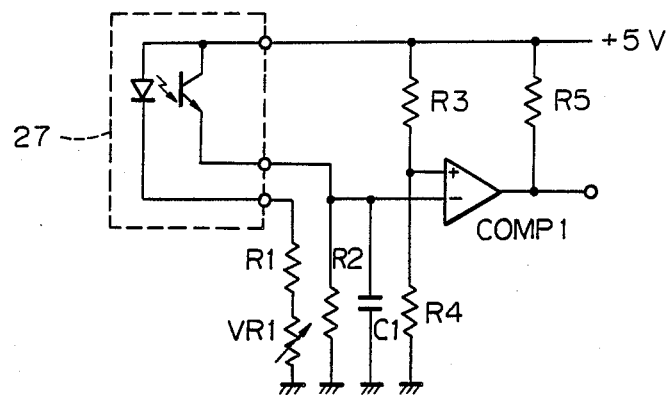
Fig. 13A
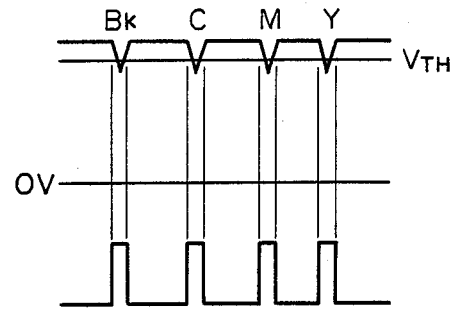
Fig. 13B
Fig. 13C
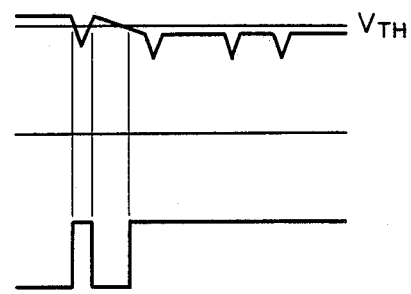
Fig. 13D

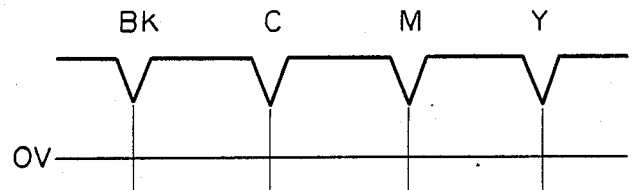
Fig. 20A
Fig. 20B
Fig. 20C
$$V_{TH} = \frac{R10}{R10+R11} \times 5 \text{ (V)}$$
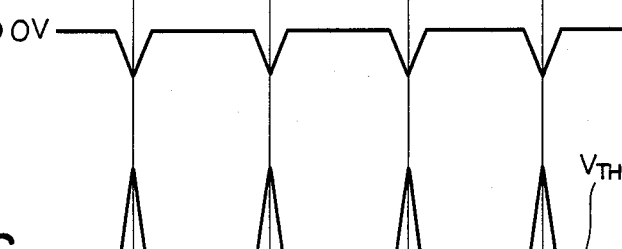
Fig. 20D
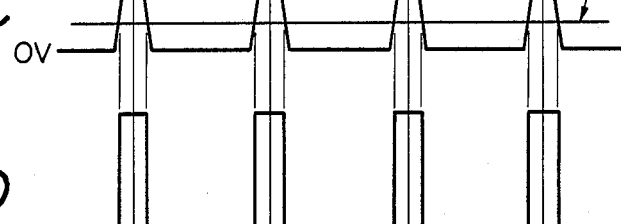
Fig. 20E
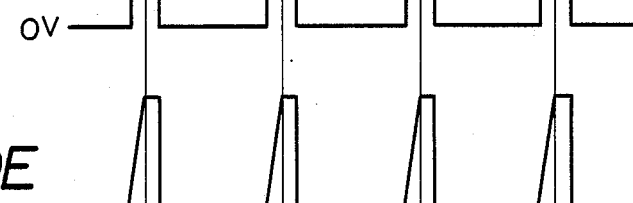
Fig. 20F
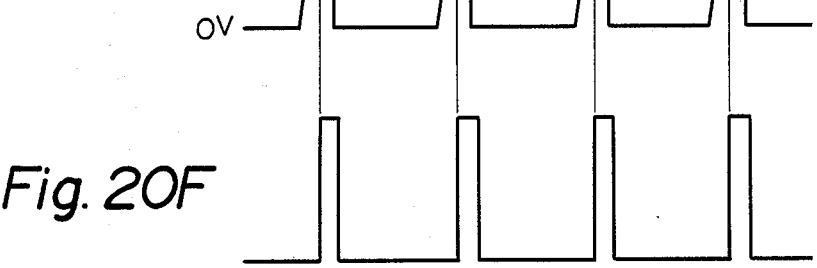

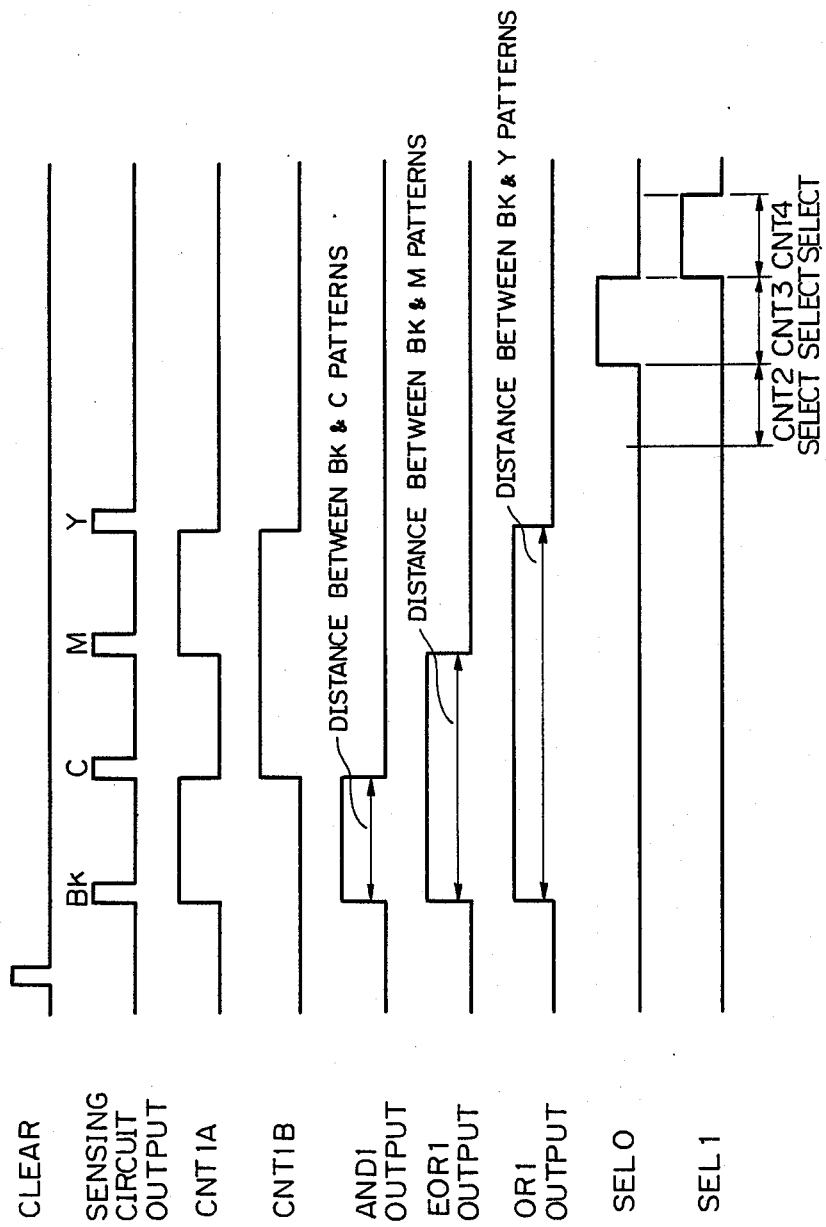

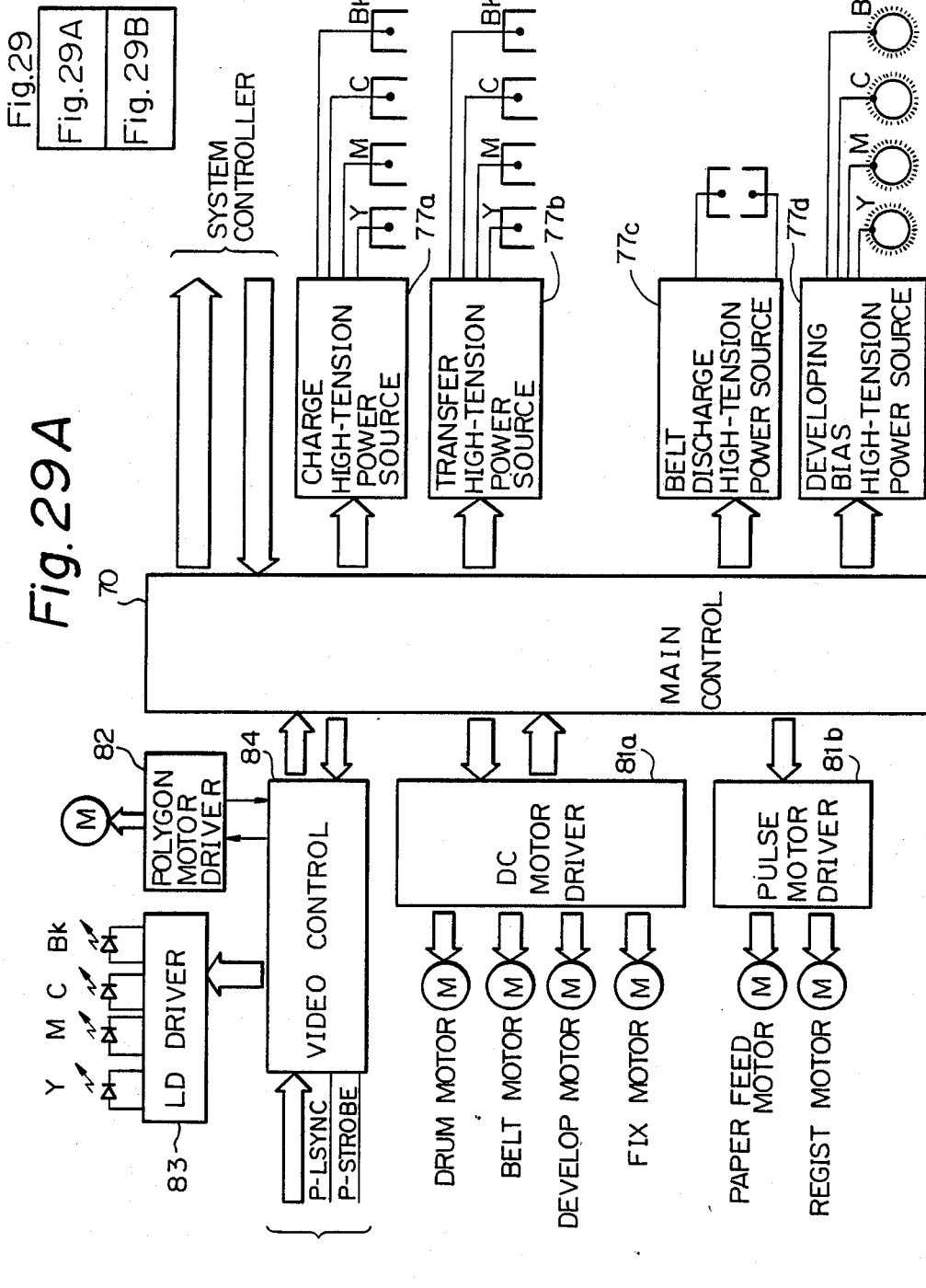

COLOR IMAGE FORMING APPARATUS

BACKGROUND OF THE INVENTION

The present invention relates to a color image forming apparatus and, more particularly, to a color image forming apparatus of the type including a plurality of photoconductive elements.

In a color electronic copier or like image forming apparatus which uses a plurality of photoconductive elements for forming a color image, image components which should be in register are often deviated from each other in an intended direction of paper feed due to the influence of various factors such as the positions and peripheral speeds of the photoconductive element, the positions where the photoconductive elements are exposed imagewise, and the linear velocity of a transfer belt. It has been customary to guarantee such various factors by the accurate machining and assembling of individual parts. This kind of approach, however, not only requires extra costs but also needs readjustment due to the variation of the individual factors and scattering which is ascribable to the replacement of parts.

An alternative approach heretofore is locating a plurality of sensors in front of each transfer station so that the sensors may sense a paper to provide a writing timing which is associated with a particular color, as disclosed in Japanese Laid-Open Patent Publication (Kokai) No. 59-155870. Even with this approach, it is difficult to control the positional deviation of color image components to below a predetermined upper limit (about 0.15 millimeter).

The positional deviation may be corrected by sensing particular patterns of different colors which are previously marked on a transfer belt. With this scheme, however, there is a fear that the patterns on the belt fail to be accurately read due to smears on the belt and/or those on a sensor, scattering of sensitivity among sensors, etc. Moreover, when the belt has a joint or scratches, even the joint or the scratches are sensed to obstruct accurate measurement of the pitch of the patterns. The accurate measurement is also unattainable when the line width of the patterns is changed as a result of changes in process conditions.

Further, the timing for starting writing an image component may be corrected on the basis of a positional deviation sensed as discussed above. This kind of scheme has a shortcoming that when the positional deviation is increased beyond a predetermined correctable range, inhibiting all the image forming modes available renders the machine practically unusable. Even when the deviation is greater than a predetermined value, image forming modes other than the mode which uses the color concerned are usable. In addition, even if the deviation associated with any color is greater than the predetermined value, a single color mode associated with that color is usable.

SUMMARY OF THE INVENTION

It is therefore an object of the present invention to provide a color image forming apparatus which with a simple construction reduces the positional deviation of a plurality of image components of different colors in an intended direction of paper feed.

It is another object of the present invention to provide a color image forming apparatus which accurately measures the positional deviation without being effected by smears on a belt and those on a sensor, scattering of sensitivity among sensors, etc.

It is another object of the present invention to provide a color image forming apparatus which accurately measures the positional deviation without being effected by scratches of a belt.

It is another object of the present invention to provide an image forming apparatus which accurately measures the positional deviation without being effected by image forming conditions.

It is another object of the present invention to provide an image forming apparatus which needs a minimum of down time in the event of a failure.

It is another object of the present invention to provide a generally improved image forming apparatus.

In an image forming apparatus having a plurality of recording devices each including a photoconductive element, a charger for uniformly charging a surface of the photoconductive element, an exposing device for exposing the photoconductive element to imagewise light, a developing device for developing an electrostatic latent image which is provided on the photoconductive element, and a transferring device for transferring the developed image from the photoconductive element to a paper, an apparatus of the present invention comprises pattern image signal generating means for forming pattern images for measurement each being associated with a respective one of a plurality of colors in a part of a surface of the transfer belt outside of a region in which a paper is to be laid, single sensing means for sensing arraival of each of the pattern images, counting means for counting a timing at which the signal sensing means senses the arrival, calculating means for calculating an amount of deviation by comparing a count of the counting means with a predetermined value, and timing signal generating means for generating a write start timing signal for each of the colors which is variable on the basis of an output of the calculating means.

BRIEF DESCRIPTION OF THE DRAWINGS

The above and other objects, features and advantages of the present invention will become more apparent from the following detailed description when taken with the accompanying drawings in which:

FIGS. 11A to 11F show the results of pattern measurement;

FIG. 12 is a circuit diagram showing a prior art pattern detecting circuit;

FIGS. 13A to 13D show waveforms of output signals of the circuit shown in FIG. 12;

Figures 18A, 18B, 18C, 18D, 18E, 18F, 18G:
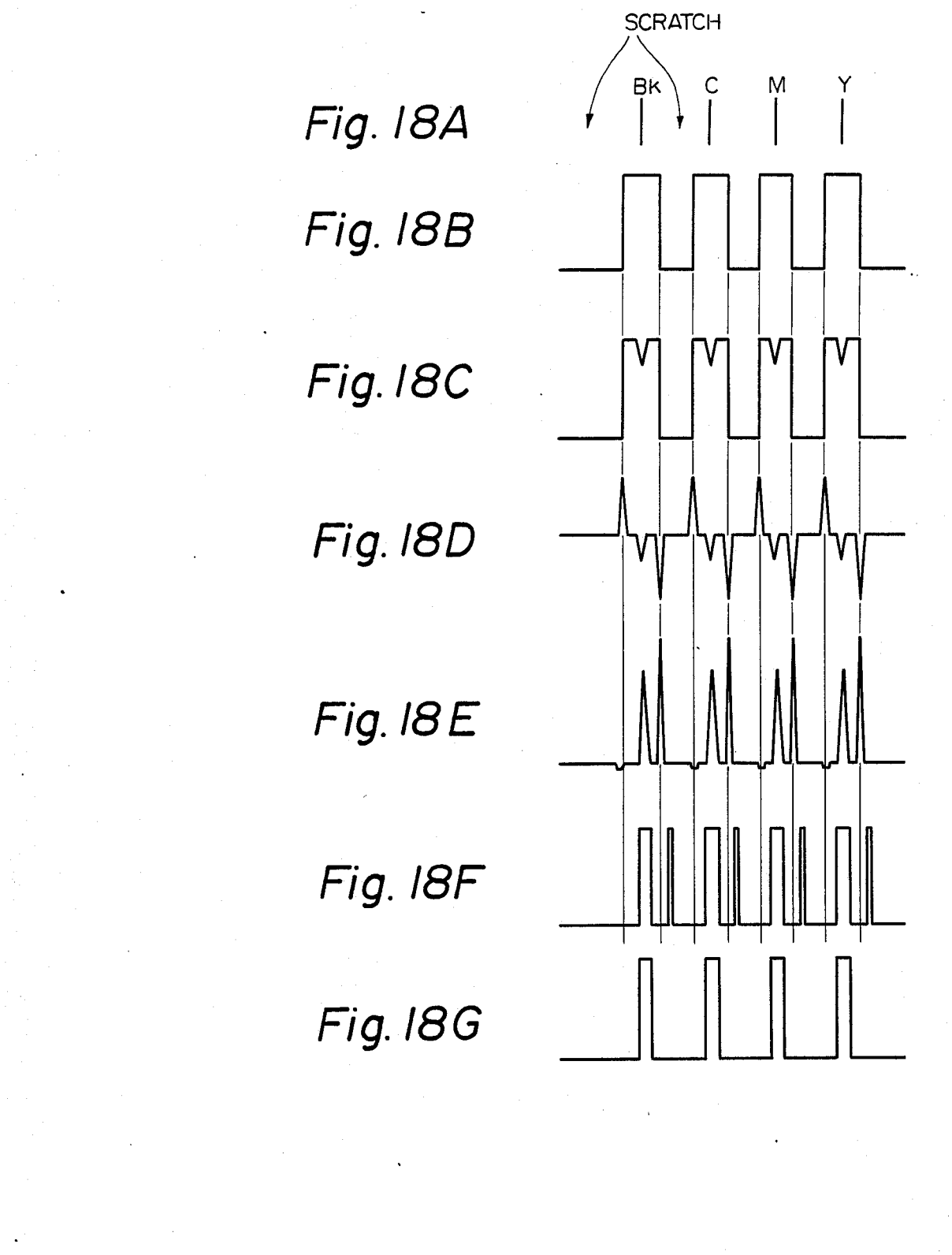

FIGS. 17A to 17G and 18A to 18G are timing charts associated with various blocks of FIG. 16 which are produced when the timing for turning on LEDs is changed;

FIGS. 20A to 20F show the waveforms of signals appearing in various portions of the circuitry shown in FIG. 19;

FIG. 22 is a timing chart associated with the circuitry of FIG. 21;

FIGS. 29A and 29B are schematic block diagrams showing, when combined as shown in FIG. 29, control circuitry associated with a printer section;

DESCRIPTION OF THE PREFERRED EMBODIMENTS

Figure 1:
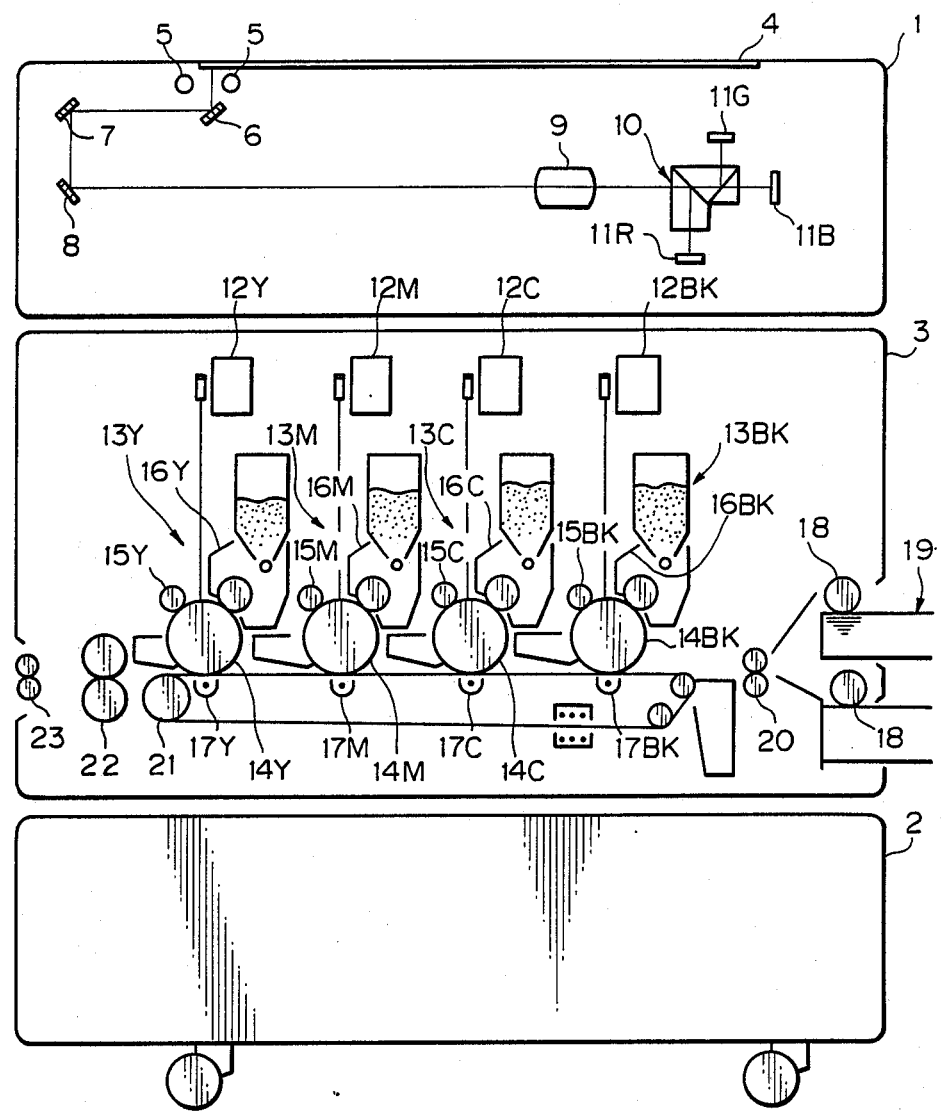
FIG. 1 is a schematic view of a digital color image forming apparatus to which the present invention is applicable.

Referring to FIG. 1 of the drawings, a color copier which is an example of color image forming apparatuses to which the present invention is applicable is shown. As shown, the color copier includes a scanner section 1 for reading an original document, an image processing section 2 for electrically processing an image signal which is a digital signal outputted by the scanner section 1, and a printer section 3 for printing out an image on a paper on the basis of image data which are associated with respective colors and outputted by the image processing section 2. The scanner section 1 includes lamps 5 such as fluorescent lamps for illuminating a document which is laid on a glass platen 4. Light emitted from the lamps 5 and then reflected by the document is incident to a lens 9 via mirrors 6, 7 and 8. The lens 9 focuses the indicent light onto a dichoric prism 10 to be thereby separated into light components having different wavelengths, e.g. a red component R, a green component G and a blue component B. These light components are individually propagated to CCD (charge coupled device) image sensors 11R, 11G and 11B which are adapted for, for example, red, green and blue. The CCD image sensors 11R, 11G and 11B each converts the incident light into a digital signal and feeds it to the image processing section 2. In response, the image processing section 2 produces color data each being associated with a respective one of the different colors, e.g. a black (BK), a yellow (Y), a magenta (M) and a cyan (C) signal.

While FIG. 1 shows an example in which an image may be formed in four different colors BK, Y, M and C as desired, an image may be formed in only three colors. In such a case, one of recording devices shown in FIG. 1 may be omitted.

The signals outputted by the image processing section 2 are applied to the printer section 3 which includes laser beam emitting devices 12BK, 12C, 12M and 12Y. In the example shown in FIG. 1, four recording devices 13Y, 13M, 13C and 13BK are arranged side by side. Since all the recording devices 13Y, 13M, 13C and 13BK are constructed in exactly the same manner as each other, the following description will concentrate on the recording device 13C by way of example. While the various structural elements of the recording devices 13Y, 13M, 13C and 13BK are designated by like reference numerals, they are distinguished from each other by the addition of characters Y, M, C and BK to the reference numerals.

The recording device 13C includes a photoconductive element 14C in the form of a drum or the like in addition to the laser beam emitting device 12C. A charger 15C, optics for exposure, a developing unit 16C, and a transfer charger 17 are associated with the drum 14C in a well known manner. The drum 14C uniformly charged by the charger 15C is exposed imagewise by the laser emitting device 12C to produce a latent image which is associated with imagewise cyan light. The developing unit 16C develops the latent image to produce a visible image. A paper is fed from a paper feed section 19 such as one of two cassettes by a feed roller 20 and then driven by a register roller 20 to a transfer belt 21 at a predetermined timing. The paper is sequentially transported by the belt 21 to the drums 14BK, 14C, 14M and 14Y each carrying a visible image component thereon. The transfer chargers 17BK, 17C, 17M and 17Y associated with the drums 14BK, 14C, 14M and 14Y, respectively, transfer the individual visible image components to the paper. Then, the paper is advanced to a fixing roller 22 so that the image components transferred thereto are fixed. Finally, the paper is fed out of the copier by a discharger roller 23. In this instance, the paper is electrostatically retained on the belt 21 and therefore accurately transferred at the operating speed of the belt 21.

Figure 2:
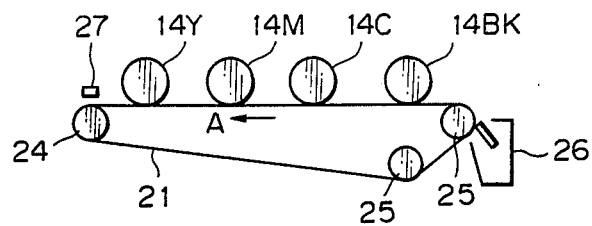
FIG. 2 is a view showing a transfer belt installed in the apparatus of FIG. 1 and its neighborhood.

FIG. 2 schematically shows an arrangement which surrounds the belt 21. The transfer belt 21 is passed over a drive roller 24 and driven rollers 25 and driven in a direction indicated by an arrow A to transport a paper. A cleaning unit 26 is provided for removing toner from the belt 21. A reflection type sensor 27 is located downstream of the drums 14BK to 14Y to serve as pattern image sensing means. Located in the vicinity of the drive roller 24, the sensor 27 serves to eliminate the influence of oscillation of the belt 21 so that a predetermined spacing is maintained between the sensor 27 and the belt 21.

Figure 3:
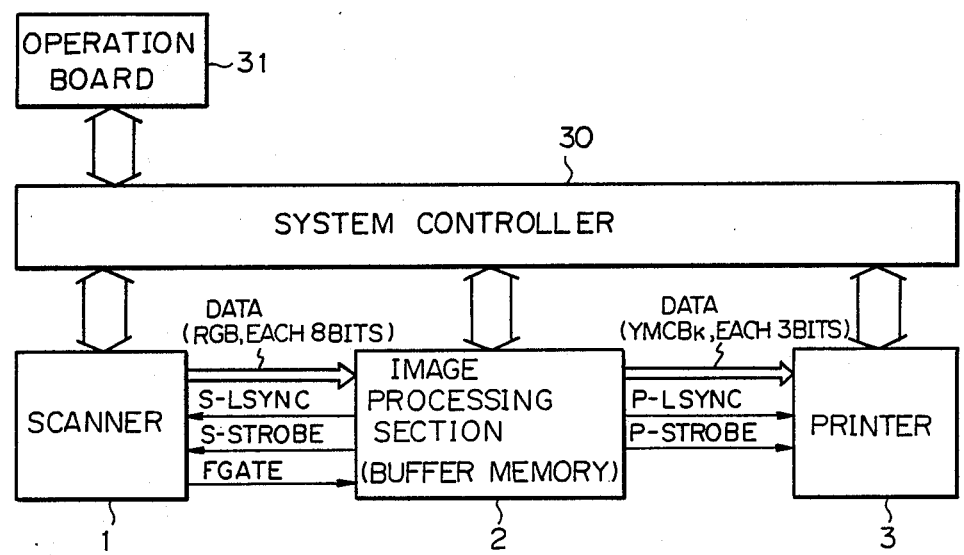
FIG. 3 is a schematic block diagram showing a control system in accordance with one embodiment of the present invention.

Referring to FIG. 3, a control system installed in the copier is shown in a schematic block diagram. A system controller 30 supervises the operations of the scanner section 1, image processing section 2 and printer section 3. Specifically, the system controller 30 performs display control and key input processing associated with an operation board 31, the delivery of start signals and magnification change signals to the scanner section 1 and printer section 3 which occurs on the basis of a particular mode selected through the operation board 31, the delivery of an image processing mode signal (commanding color conversion, masking, trimming, mirroring, etc.), and the control over the entire system based on failure signals and operation status signals (Wait, Ready, Busy, Stop, etc.) which may be outputted by the various modules 1, 2 and 3.

The scanner section 1 scans a document at a rate matching with a magnification change ratio which is represented by a start signal fed from the system controller 30. CCD arrays or the like of the scanner section 1 read an image carried on the document, and the resulting R, G and B image data each having eight bits are fed to the image processing section 2 in synchronism with a horizontal sync signal (S-LSYNC), an image clock (S-STROBE) and a vertical sync signal (FGATE) which are outputted by the image processing section 2.

The image processing section 2 subjects the 8-bit R, G and B image data to gamma-correction, undercolor removal (UCR), color correction and other various kinds of image processing, thereby producing Y, M, C and Bk image data each having three bits. These 3-bit image data are delivered to the printer section 3. Further, the section 2 responds to commands from the system controller 30 by executing magnification change processing, masking, trimming, color change, mirroring and like editing operations. Also included in the section 2 is a buffer memory for outputting each o the Y, M, C and BK image components at a delay which corresponds to the distance between the nearby drums of the printer section 3.

The printer 3 operates the laser beam emitting devices on the basis of the 3-bit image data Y, M, C and BK fed thereto from the image processing section 2, so that a composite color image is reproduced on a paper by an electrophotographic process.

Figure 4:
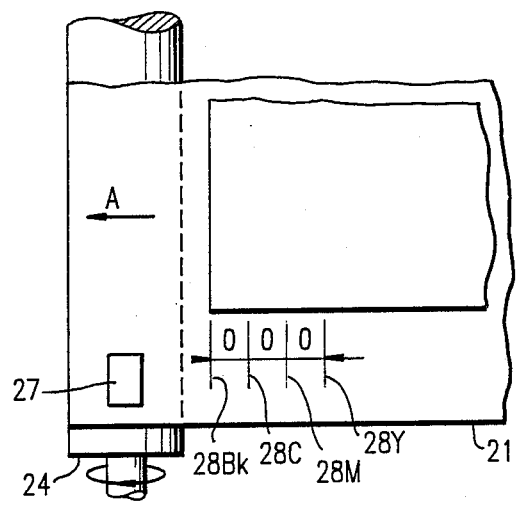
FIG. 4 shows an example of patterns for measurements applicable to the present invention.

FIG. 4 shows an example of patterns which may be provided on the transfer belt 21 to be sensed. Pattern image signal generating means feeds signals to the recording devices 13BK, 13C, 13M and 13Y to provide visible pattern images on the transfer belt 21 outside of a paper region of the belt 21. The visible images are spaced apart from each other by a distance of a (millimeter). The pattern images 28BK, 28C, 28M and 28Y are sequentially moved past and sensed by sensors 27R and 27F. It is to be noted that the distance a may be selected as desired by setting the exposure timings of the respective recording devices.

Figure 5A:
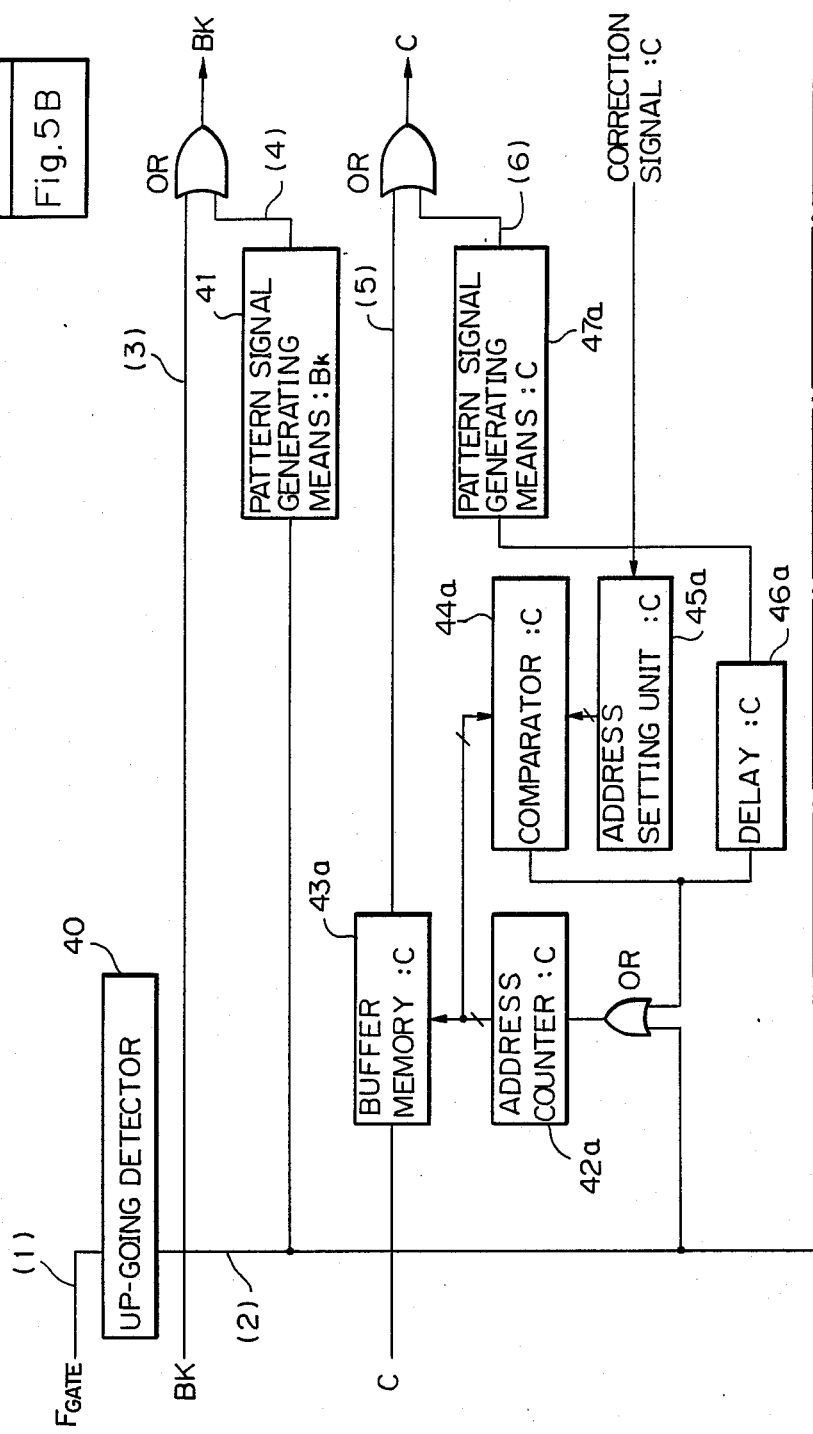
FIG. 5 is a schematic block diagram showing a specific arrangement of buffer memories and pattern image signal generating means.
Figure 5B:
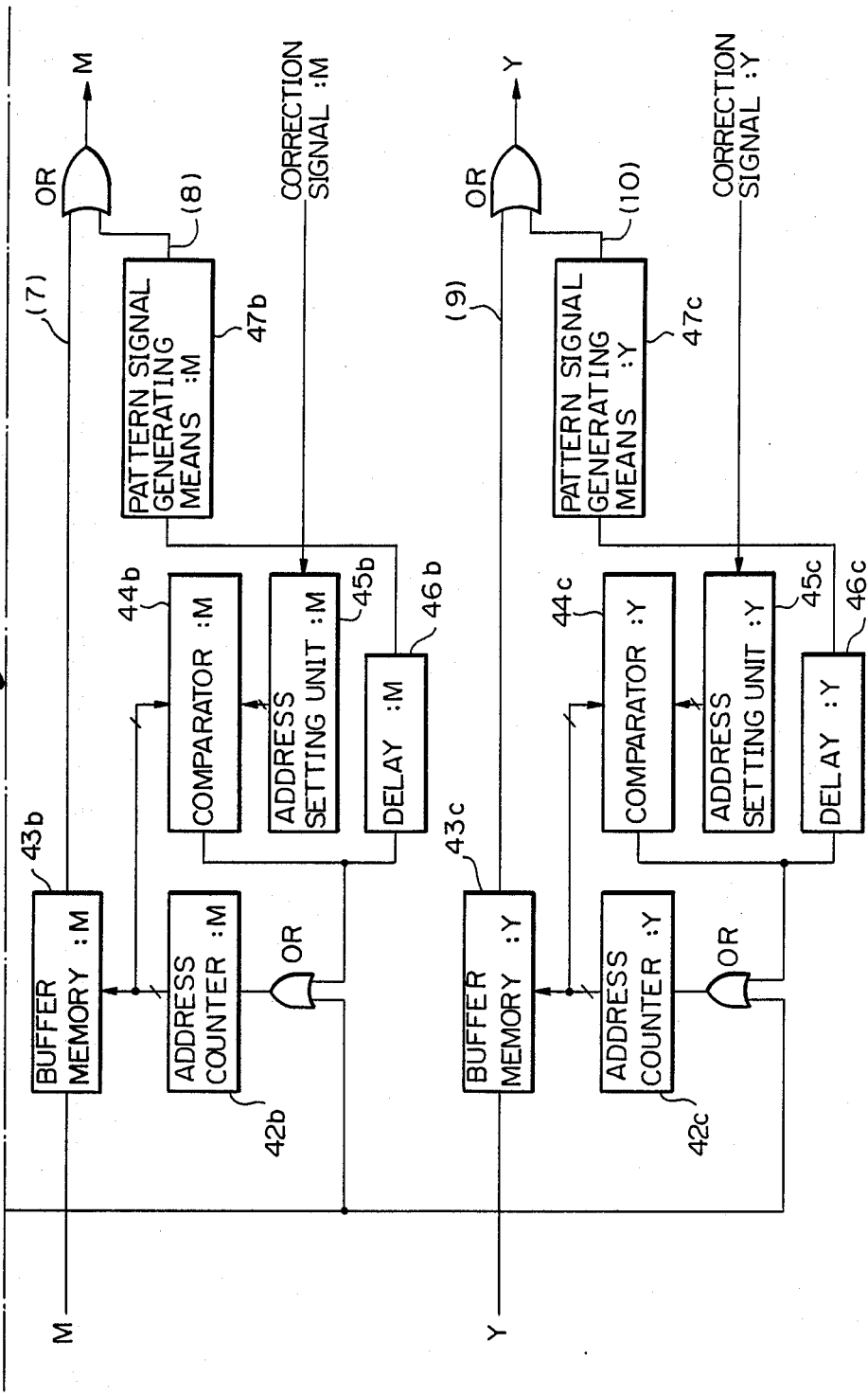
Figure 6:
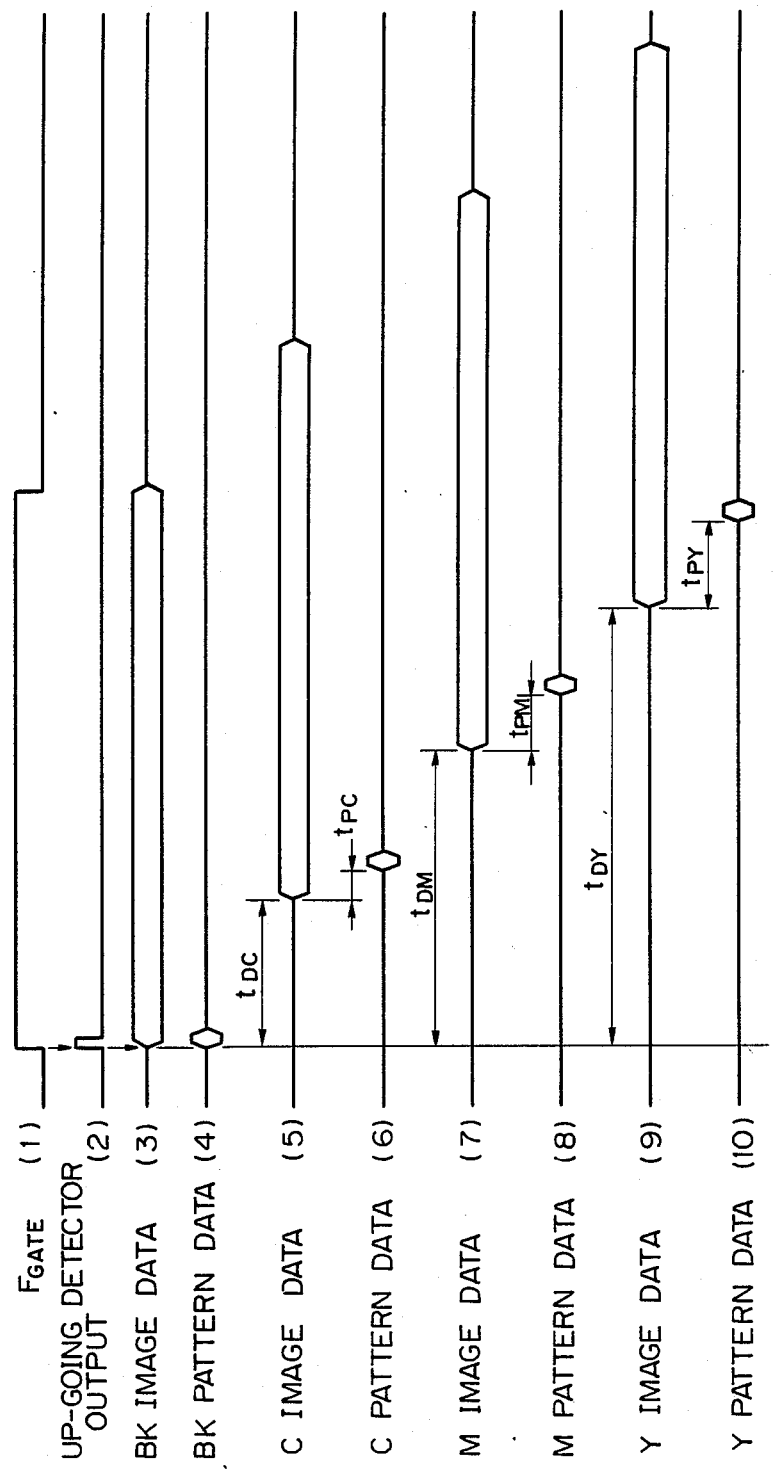
FIG. 6 is a timing chart demonstrating the operations of various blocks shown in FIGS. 5A and 5B.
Figure 7:
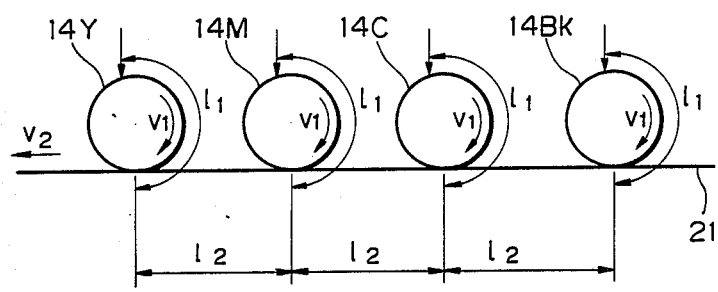
FIG. 7 is a diagram useful for understanding how a delay time of image data is set up.

In the color copier shown in FIG. 1, the image data of different colors have to be sequentially fed out from the image processing section 2 at deviated timings which are associated with the distance between the drums 14BK, 14C, 14M and 14Y. FIG. 5 shows a buffer memory and pattern image signal generating means which are so constructed as to meet the above need. The operation of various blocks shown in FIG. 5 are shown in a timing chart in FIG. 6 (waveforms appearing in portions (1) to (10)). Since the recording devices are arranged in the order of B, C, M and Y in the illustrative embodiment, image data BK processed by the image processing section 2 is directly outputted while the other image data C, M and Y are respectively delayed by $t_{DC}$, $t_{DM}$ and $t_{DY}$ relative to the image data BK. The delay times $t_{DC}$, $t_{DM}$ and $t_{DY}$ are individually determined as will be described with reference to FIG. 7. As shown in FIG. 7, assume that the circumferential distance between an exposing position and transferring position of each of the drums 14BK, 14C, 14M and 14Y is $l_1$ (millimeter), the linear velocity of each drum is $v_1$ (millimeter per second), the distance between the nearby drums is $l_2$ (millimeter), and the linear velocity of the transfer belt 21 is $v_2$ (millimeter per second). Then, the period of time $t_1$ required between exposure and transfer and which is common to all the drums is expressed as:

$$t_1 = l_1/v_1 \text{ (second)}$$

Assuming that the period of time $t_2$ required for the belt 21 to move between the nearby drums, $$t_2 = l_2/v_2 \text{ (second)}$$

Hence, the conditions necessary for all the images of different colors to be reproduced in the same position are as follows:

$$t_{DC} = l_2/v_2 \text{ (second)}$$

$$t_{DM} = 2l_2/v_2 \text{ (second)}$$

$$t_{DY} = 3l_2/v_2 \text{ (second)}$$

Since the circuit constructions for C, M and Y are the same, the following description will be made on BK and C by way of example. A positive-going edge of the vertical sync signal FGATE from the scanner section 1 is detected by a detector 40. Since the signal FGATE is inputted simultaneously with the inputs BK, C, M and Y, an output of the detector 40 is representative of the beginning of BK image writing. The output of the detector 40 is applied to BK pattern signal generating means 41 to generate a pattern. Hence, as for BK, the pattern is aligned with the leading edge of an image with respect to the direction of movement of the belt 21 (see FIG. 4). The output of the detector 40 is fed to a reset terminal of an address counter 42a via an OR gate so as to reset the address counter 42a. The input C image data is written into a buffer memory 43a on the basis of the count of the address counter 42a. An output of the address counter 42a is compared by a comparator 44a with a reference value which is set by an address setting unit 45a. When the output of the address counter 42a coincides with the reference value, the comparator 44a produces a coincidence signal. The coincidence signal is applied to a reset terminal of the address counter 42a via an OR gate, whereby the address counter 42a is reset and the address 0 of the buffer memory 43a is accessed again. After image data has been read out of the buffer memory 43a, new image data is written into the same address as the previous image data.

If the distance ($t_{DC}$) between the BK and C drums is selected to be the reference value as set by the address setting unit 45a, the BK and C images can be reproduced on a paper in register with each other. The coincidence signal from the comparator 44a is applied to a delay device 46a also. After the delay circuit 46a has been triggered by the coincidence signal, pattern signal generating means 47a outputs a pattern upon the lapse of a predetermined period of time. Since the coincidence signal appears simultaneously with the leading end of an image, the C pattern is delayed by a period of time ($t_{DC}$) which is determined by the delay device 46a relative to the leading edge of an image. If the delay time set by the delay device 46a is selected to be the period of time which the belt 21 needs to move over the distance a, the C pattern can be provided at a delay of a relative to the leading edge of an image.

The same is true for M and Y. Specifically, the leading edges of M and Y images will be in register if an address setting unit 45b produces a reference value $t_{DM}$, an address setting unit 45c produces a reference value $t_{DY}$, a delay device 46b is loaded with a delay time $t_{PM} = 2a/v_2$, and a delay device 46c is loaded with a delay time $t_{PY} = 3a/v_2$. At the same time, the patterns to be sensed can be outputted at the pitch of a (millimeter).

Figure 8A:
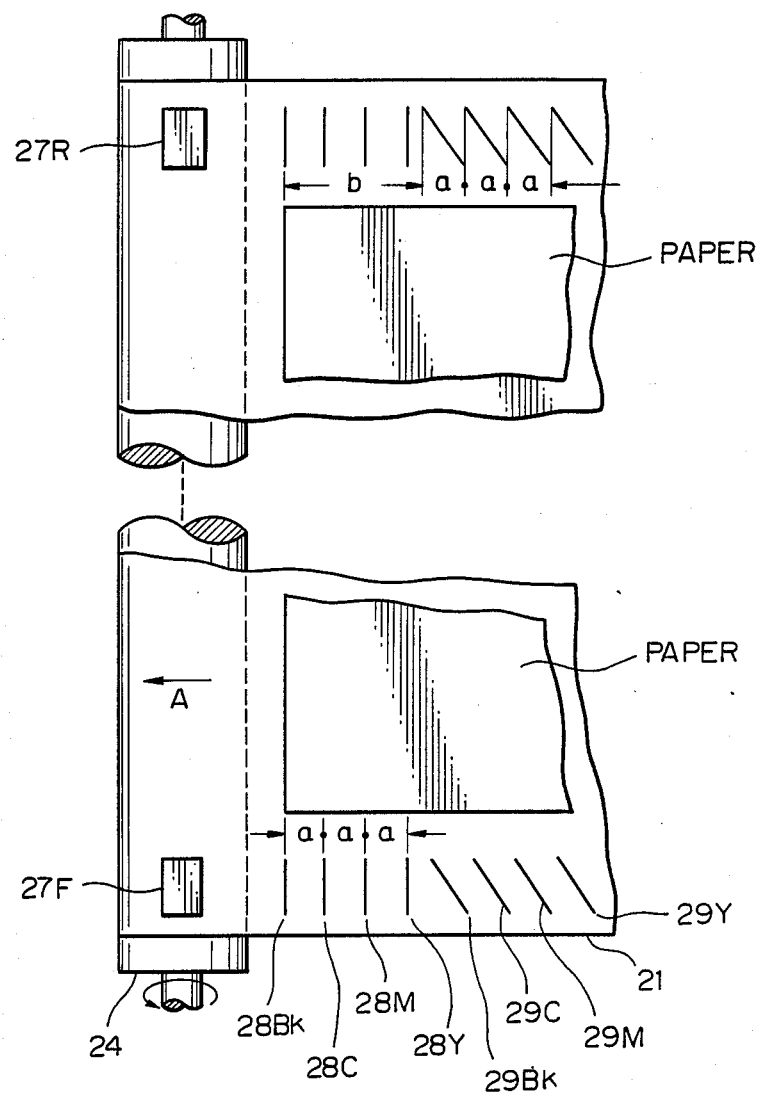
FIG. 8A shows another example of patterns for measurements applicable to the present invention.

FIG. 8A shows another example of patterns which may be provided on the transfer belt 21 to be sensed. Pattern image signal generating means feeds signals to the recording devices 13BK, 13C, 13M and 13Y to provide visible pattern images on the transfer belt 21 outside of a paper region of the belt 21. The visible images are spaced apart from each other by distances of a (millimeter) and b (millimeter). Specifically, the pattern images are combined of horizontal lines which are spaced apart by the distance a and slant lines which are spaced apart from the horizontal lines by the distance b. The pattern images 28BK, 28C, 28M and 28Y are sequentially moved past and sensed by sensors 27R and 27F. It is to be noted that the distances a and b may be selected as desired by setting the exposure timings of the respective recording devices.

Figure 8B:
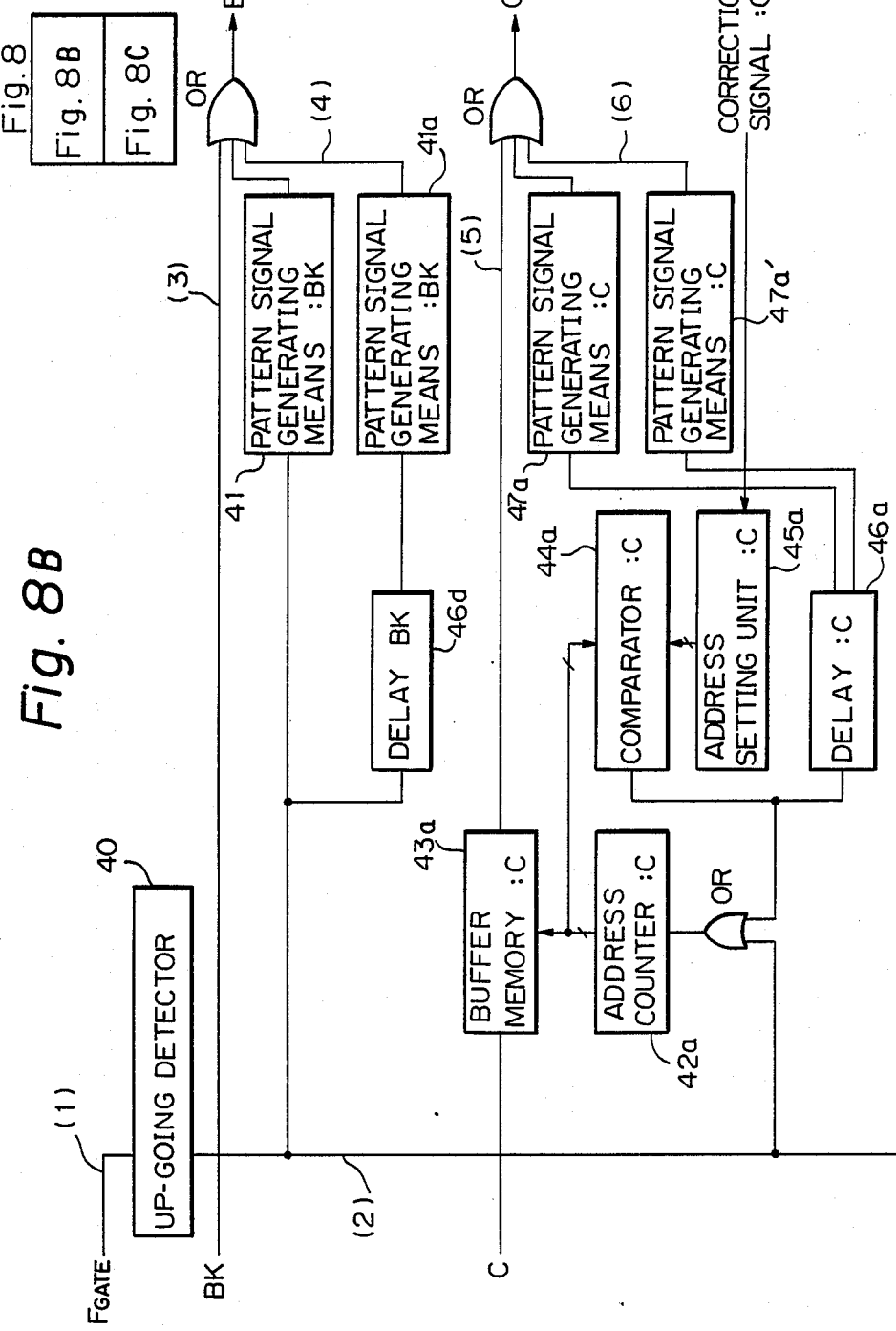
FIGS. 8B and 8C are schematic block diagrams showing an alternative arrangement of the buffer memories and pattern image signal generating means.
Figure 8C:
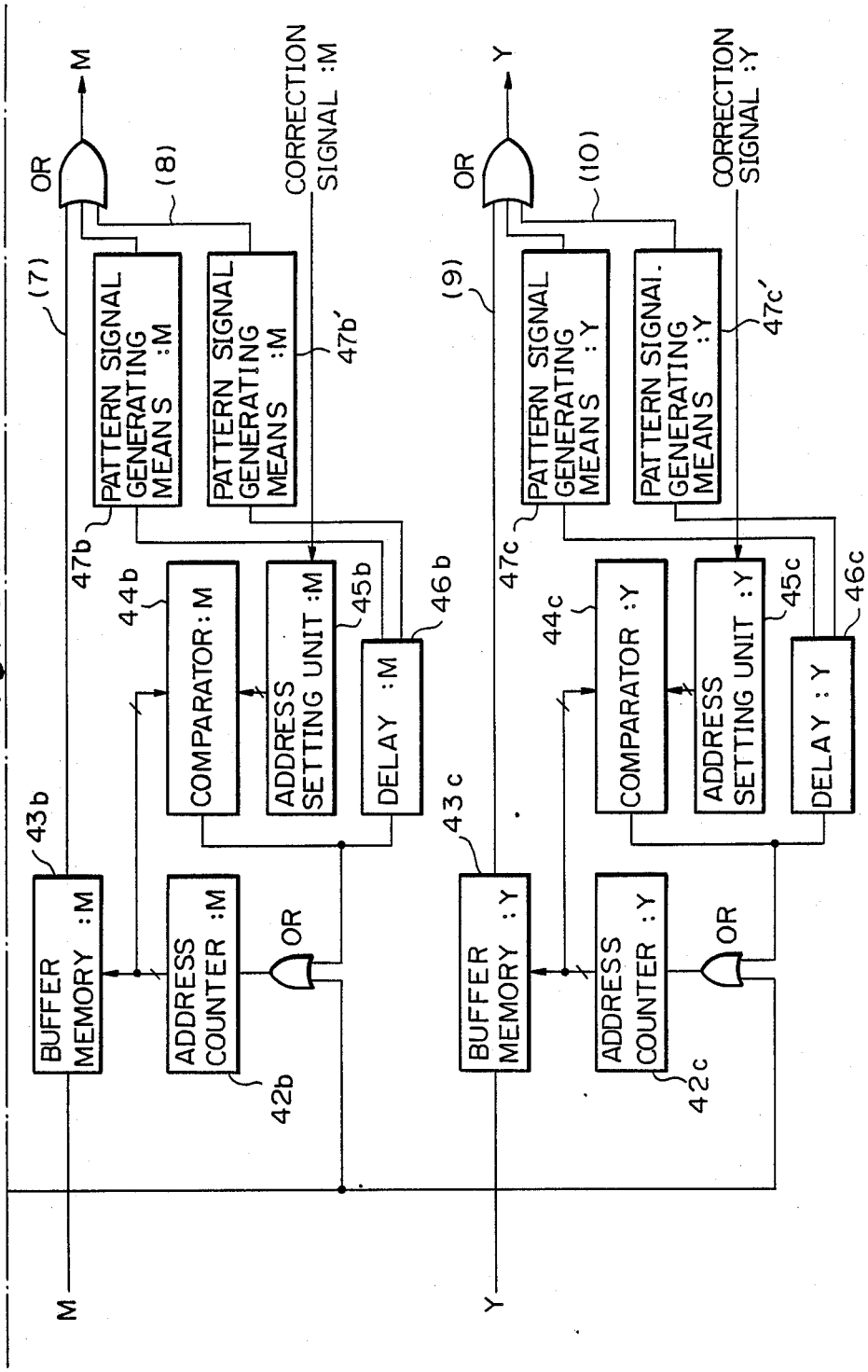

In the color copies shown in FIG. 1, the image data of different colors have to be sequentially fed out from the image processing section 2 at deviated timings which are associated with the distance between the drums 14BK, 14C, 14M and 14Y. FIGS. 8B and 8C show different buffer memory and pattern image signal generating means which are so constructed as to meet the above need.

Figure 9:
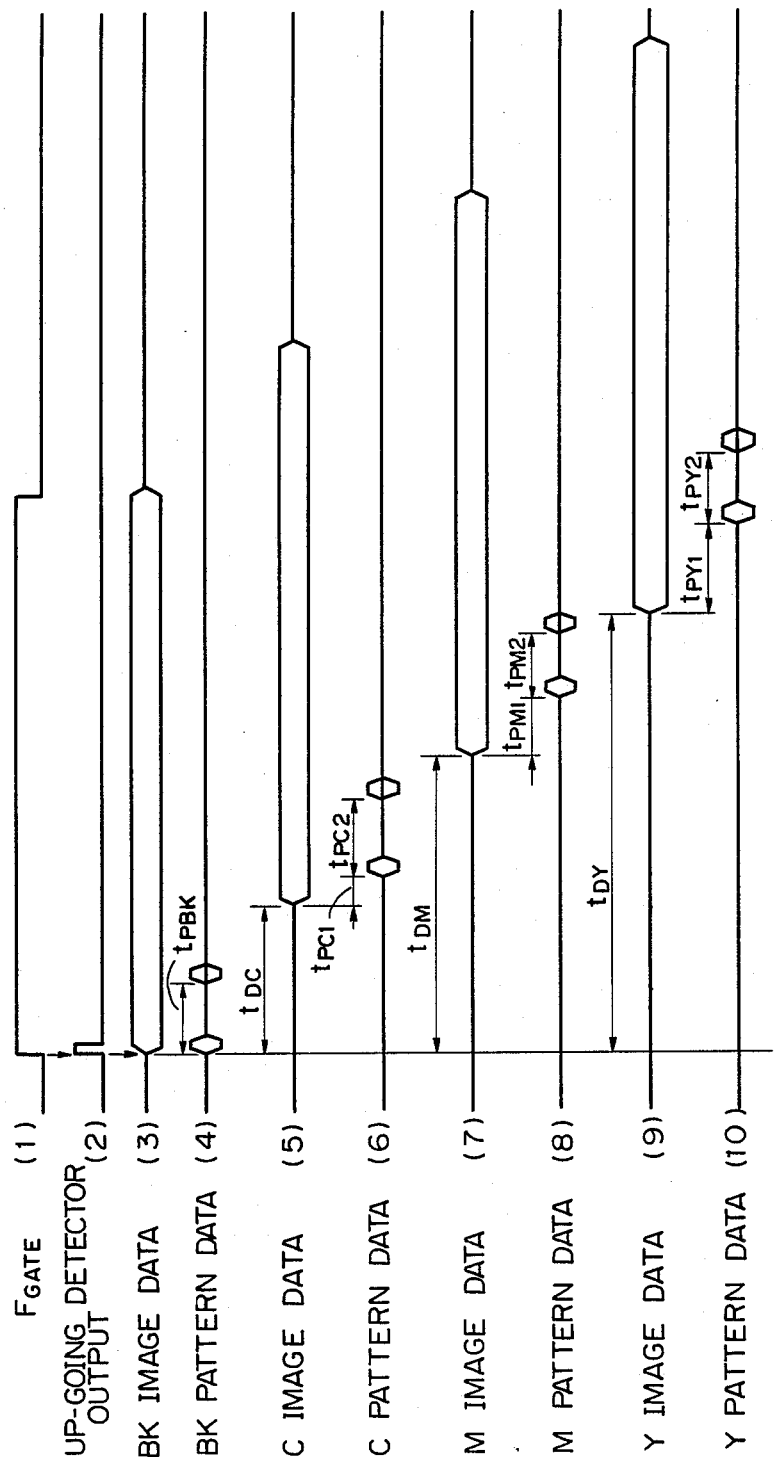
FIG. 9 is a timing chart representative of the operations of various blocks shown in FIGS. 8B and 8C.

The operation of the circuit of FIGS. 8B and 8C is shown in a timing chart in FIG. 9. In FIGS. 8B and 8C the output of the detector 40 is applied to an OR gate via a delay device 46d and the pattern signal generating means 41a. The output of the delay device 46a is fed to an OR gate via pattern signal generating means 47a'. The output of the delay device 46b is routed through pattern signal generating means 47b' to an OR gate, and the output of the delay device 46c is routed through pattern signal generating means 47' to an OR gate. In this construction, the delay device 46a produces a second output upon the lapse of a delay time (tpc2). In response to this signal, the other pattern signal generating means 47a outputs a slant line pattern (FIG. 8A). As for BK, too, the output of the detector 40 is directly applied to the pattern signal generating means 41 and to the delay device 46d, do that a pattern is outputted upon the lapse of a delay time (tpBK). If the delay times tpBK and tpc2 are each equal to the period of time which is required for the belt 21 to move over the distance b, a horizontal black line will be aligned with the leading edge of an image, a C horizontal line, an M horizontal line and a Y horizontal line will be provided side by side at a distance a, and a black slant line pattern will be provided at a distance b from the black horizontal line, as shown in FIG. 8A. Likewise, a C slant line, an M slant line and a Y slant line will be provided side by side at a distance a from the BK slant lines.

Since both the horizontal line pattern and the slant line pattern are provided at a distance b, the delay devices are loaded with delay times as shown below:

$$tpBK = tpc2 = tpm2 = tpy2 = b/v_2$$

When the horizontal line pattern and the slant line pattern are formed at each of laterally opposite sides R and F of the belt 21 as shown in FIG. 8A, various kinds of positional deviations of images can be detected by measuring the distance between the opposite patterns by the photosensors 27F and 27R. Although printers and copiers are in practice so adjusted as to minimize various kinds of positional deviations before the delivery to users, substantial deviations and local irregularity of images are unavoidable during operation because various mechanical sections of such machines are susceptible to ambient temperature and humidity.

Figure 10A:
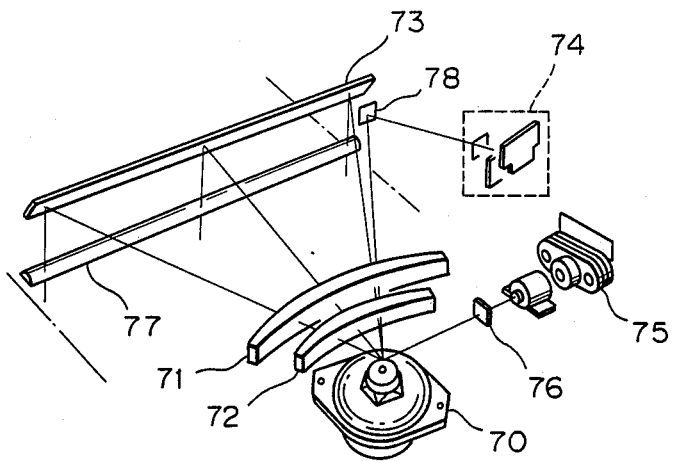
FIG. 10A is a perspective view of a laser writing system.
Figure 10B:
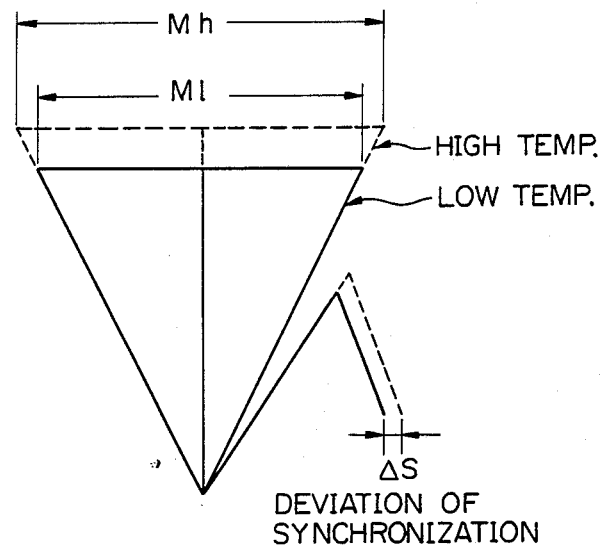
FIG. 10B is a diagram explanatory of deviations in position and synchronization ascribable to temperature which is particular to the laser writing system.

Referring to FIG. 10A, a typical laser writing system is shown. What is important with a system of the type shown in FIG. 10A is the accuracy in the relative position of a polygon motor 70, f-theta lenses 71 and 72, a mirror 73, and a synchronization detecting unit 74. Also shown in FIG. 10A are a laser diode (LD) unit 75, a third cylinder lens 76, a second cylinder lens 77, and a synchronizing mirror 78. As the temperature of an optics unit rises to cause a housing which supports various units to expand, the optical path extending between a polygon mirror and focusing plane (surface of a photoconductive element) is increased in length to in turn increase the magnification of an image (FIG. 10B). In addition, the detection of synchronization is deviated from the expected optical path with the result that the write start timing and therefore the horizontal register is effected.

FIGS. 11A to 11B show the result of measurement of a pattern-to-pattern distance which was performed under the above-mentioned defective conditions. To facilitate an understanding, only the BK pattern is shown in those figures. A slant line pattern (preferably inclined by 45 degrees) is produced tpBK later than a horizontal line pattern. The period of time [t"pBK(R)] which expires before the sensor on the R side senses the slant line pattern is longer than the period of time [t'pBK(R)] which is associated with a non-deviation condition. This shows that the pattern is deviated in a direction indicated by an arrow (outward). Likewise, by comparing an output t"pBK(F) of the sensor on the F side with t'pBK, it is understood that the pattern on the F side is deviated as indicated by an arrow (outward). Under the illustrative conditions, therefore, an image is formed by a greater magnification than usual. As regards the reference values t'pBK(F) and t'pBK, those values which are associated with optimal conditions are stored beforehand.

Assume that the BK, C, M and Y images are dislocated on a paper due to scattering of position and exposing station among the photoconductive elements and scattering of linear velocity among the photoconductive elements and the transfer belts. Then, the patterns to be sensed are also dislocated. Hence, the amount of deviation of an image can be determined by measuring the distance between the patterns.

Referring to FIG. 12, a prior art pattern sensing circuit is shown. As shown, the reflection type sensor 27 includes a phototransistor Ph the output of which is connected to a resistor $R_2$. The resistor $R_2$ converts an output current of the phototransistor Ph into a voltage which is then fed to a comparator COMP1. The comparator COMP1 compares the input voltage with a reference voltage V?? which is determined by resistors R3 and R4, producing an output having a rectangular waveform. As shown in FIGS. 13A and 13B, in normal conditions, the rectangular wave produced by the comparator COMP1 accurately corresponds to the patterns of different colors. However, when the sensor output is effected by smears, scattering of sensor sensitivity and others to appear as shown in FIG. 13C by way of example, the comparator COMP1 fails to produce an accurate rectangular wave (FIG. 13D).

Figure 14:
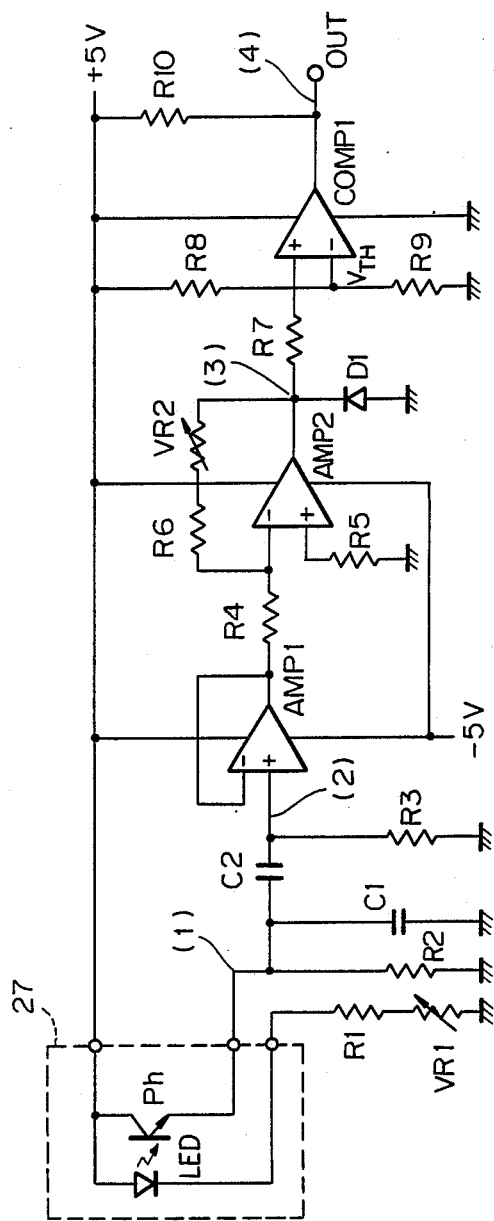
FIG. 14 is a circuit diagram showing a specific construction of a pattern detecting circuit in accordance with the present invention.
Figure 15A:
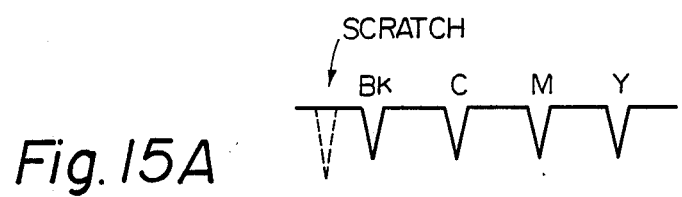
FIGS. 15A to 15D show waveforms representative of output signals of various blocks shown in FIG. 8.
Figure 15B:
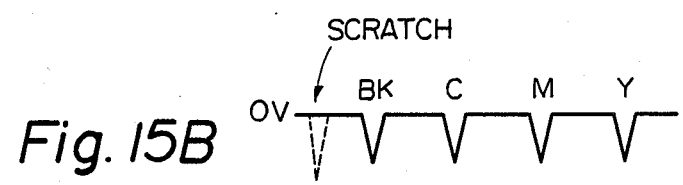
Figure 15C:
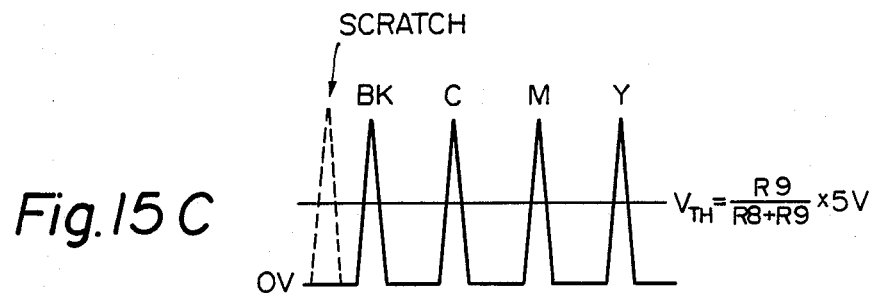
Figure 15D:
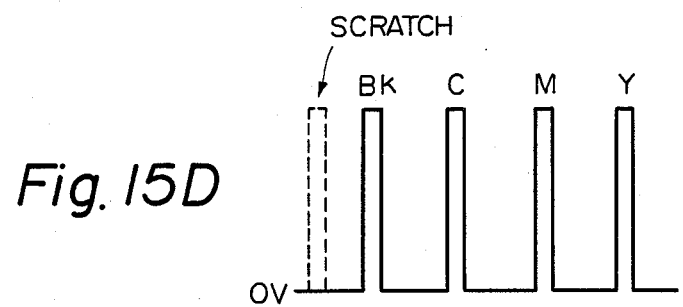

Referring to FIG. 14, a specific construction of a pattern sensing circuit in accordance with the present invention is shown. A reflection type sensor 27 has a phototransistor Ph which is connected to a resistor $R_2$. The resistor $R_2$ converts an output current of the phototransistor Ph into a voltage (waveform shown in FIG. 15A). A capacitor C2 cuts a DC component of the output voltage of the resistor $R_2$ to thereby produce an AC component only (waveform shown in FIG. 15B). The output of the capacitor C2 is routed through a voltage follower AMP1 to an inverting amplifier AMP2 to be amplified to a suitable voltage level (waveform shown in FIG. 15C). A comparator COMP1 compares an output of the amplifier AMP2 with a reference voltage $V_{TH}$ which is determined by resistors R8 and R9, outputting a result of comparison (rectangular waveform shown in FIG. 15D). By measuring the pitch of the rectangular output of the comparator COMP1, it is possible to determine the distance between the patterns which are transferred to the transfer belt 21.

Figure 16:
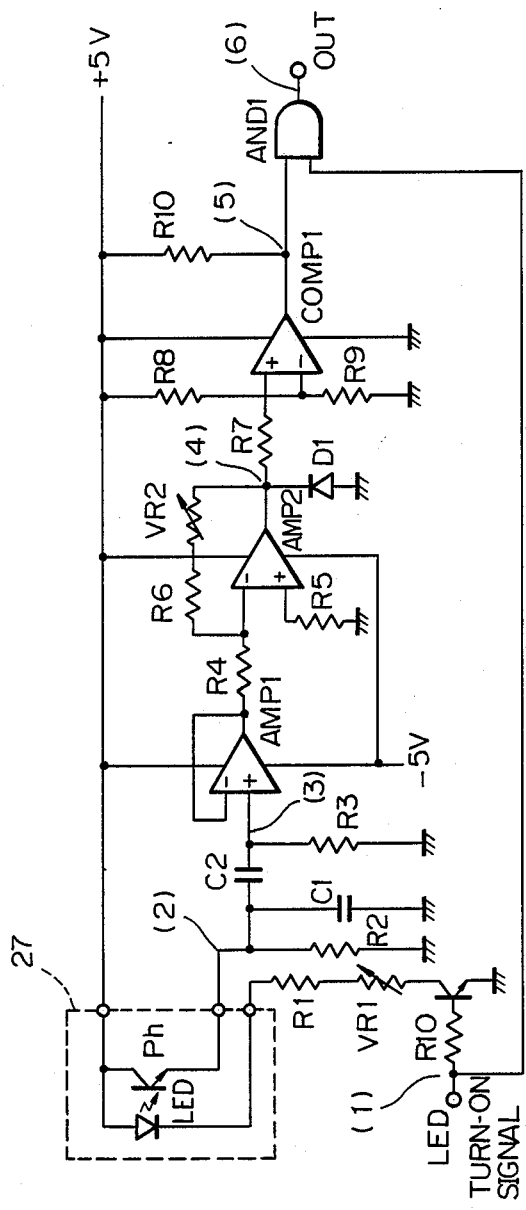
FIG. 16 is a circuit diagram showing an alternative construction of the pattern detecting circuit in accordance with the pattern invention.

On the other hand, assume that the transfer belt 21 has a scratch or like defect as indicated by dashed lines in FIGS. 15A to 15D. Since such a defect cannot be discriminated from the patterns to be sensed, they appear in the output of a sensing circuit and thereby prevents the circuit from accurately determining the pitch of the patterns. A pattern sensing circuit in accordance with the present invention which solves this problem is shown in FIG. 16. The circuit shown in FIG. 16 is constructed such that light emitting diodes (LEDs) of the sensor 27 are on-off controlled by a controller to eliminate the influence of a defect of the transfer belt 21. FIGS. 17A to 17G show waveforms which appear when the LEDs are continuously turned from the instant immediately before the pattern BK arrives at the sensor to the instant immediately after the pattern Y has moved away from the sensor. As shown, since the LEDs are turned on at a point immediately before the pattern BK (FIG. 17B), the sensor is prevented from detecting a defect which preceeds the pattern BK. Nevertheless, when the output voltage of the sensor is detected by the capacitor C2, a positive-going portion and a negative-going portion which occur when the LEDs are turned on and turned off, respectively, appear in the output of the capacitor C2. The influence of the positive-going portion may be eliminated by clamping it to substantially zero volt by a diode D1 because it is made negative by the inverting amplification. The influence of the negative-going portion is eliminated by ANDing a comparator output and an LED turn-on signal. While the method described is successful in reducing the probability of the sensor output being effected by a defect, it cannot cope with a defect which is interposed between the patterns to be sensed.

Figure 17A:
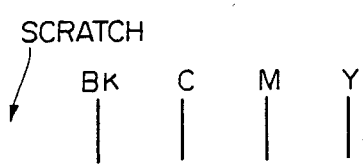
Figure 17B:
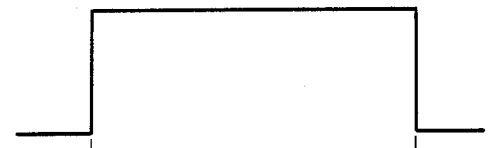
Figure 17C:
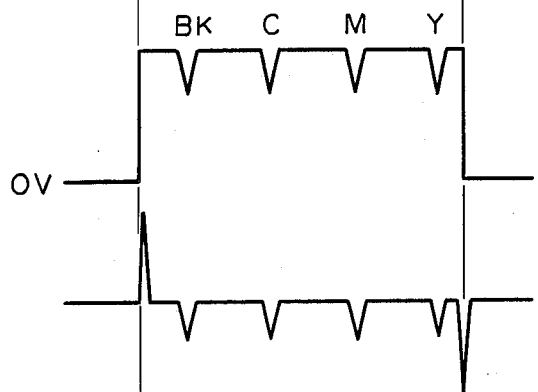
Figure 17E:
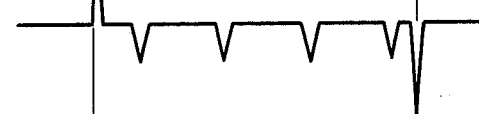
Figure 17F:
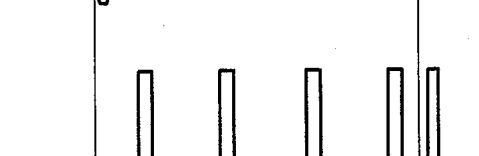
Figure 17G:
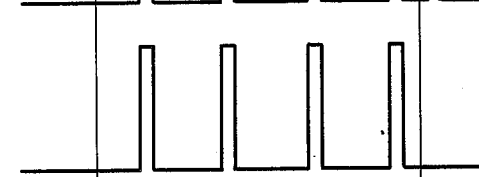

FIG. 17A shows a condition of the transfer belt 21. FIGS. 17B, 17C, 17D, 17E, 17F and 17G respectively show waveforms which appear at the portions which are indicated by (1), (2), (3), (4), (5) and (6) in FIG. 16.

FIGS. 18A to 18G are views similar to FIGS. 17A to 17G and representative of a method which turns on and off the LEDs on a pattern basis. This eliminates not only the influence of a defect which precedes the patterns but also a defect which is interposed between the patterns. How the influence of turn-on and turn-off of the LEDs on the waveform is prevented is the same as in FIGS. 17A to 17G.

Figure 19:
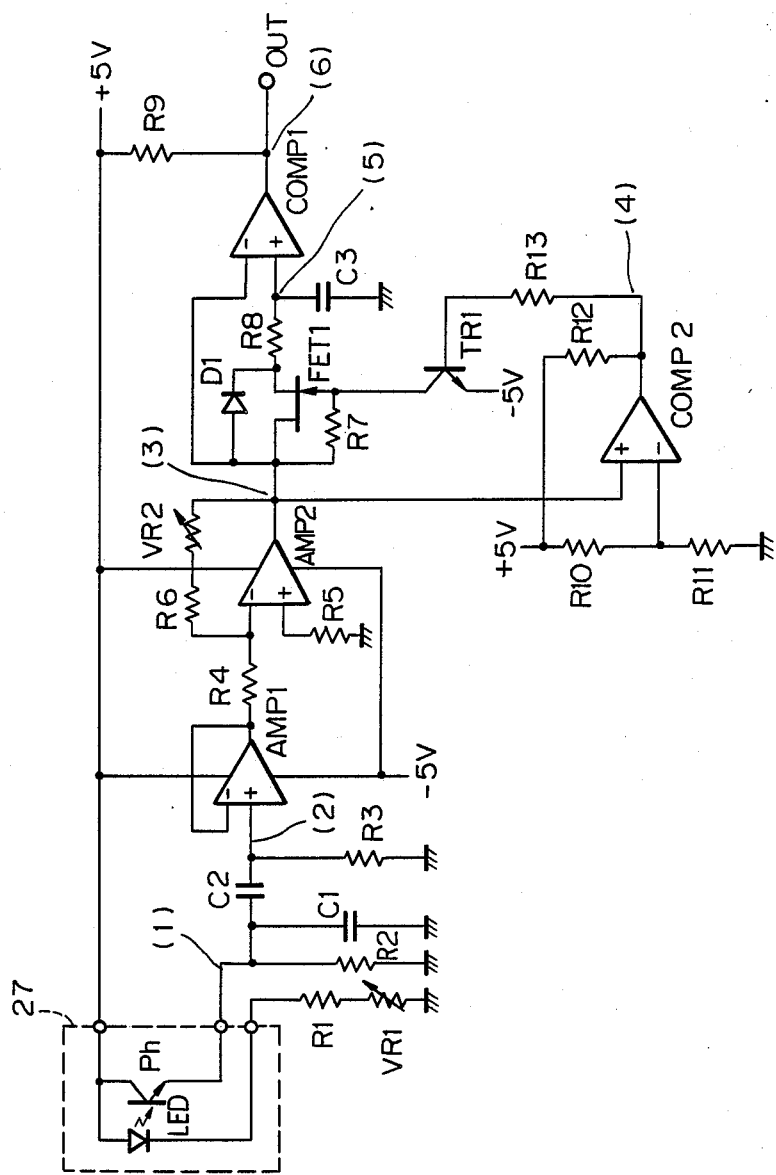
FIG. 19 is a circuit diagram showing another specific construction of the pattern detecting circuit in accordance with the present invention.

Referring to FIG. 19, another specific construction of the pattern sensing circuit in accordance with the present invention is shown. An output current of the phototransistor Ph of the sensor 27 is converted by the resistor $R_2$ into a voltage (waveform of a potion (1) shown in FIG. 20A). The output voltage of the resistor $R_2$ is applied to the capacitor C2 which then cuts a DC component of the voltage to produce an AC component only (waveform of a portion (2) shown in FIG. 20B). This signal is fed to the inverting amplifier AMP2 via the voltage follower AMP1 to be thereby amplified to a suitable voltage level (waveform of a portion (30) shown in FIG. 20C). A comparator COMP2 compares the output of the AMP2 with a reference voltage $V_{TH}$ which is determined by resistors 10 and 11, producing a rectangular wave (waveform of (4) shown in FIG. 20D). When this rectangular output of the comparator COMP2 has a high level, a transistor TR1 is turned on to pull in the gate of a field effect transistor FET1 to −5 volts and, therefore, the transistor FET1 is turned off. Under this condition, the output of the amplifier AMP2 is continuously fed to a capacity C3 via a diode D1 to charge it. Since the diode closes a discharging circuit, the capacitor C3 holds the peak value of the amplifier AMP2 (waveform of a portion (5) shown in FIG. 20E). The comparator COMP1 compares the voltage held by the capacitor C3 with the output of the AMP2, and its output becomes a high level if the output of the amplifier AMP2 is lower than the peak value. That is, the peak value of the sensor output can be detected. By measuring the pitch of the output pulses of the comparator COMP1, it is possible to accurately determine the distance of the patterns which are transferred to the belt 21 (waveform of a portion (6) shown in FIG. 20F).

Figure 21:
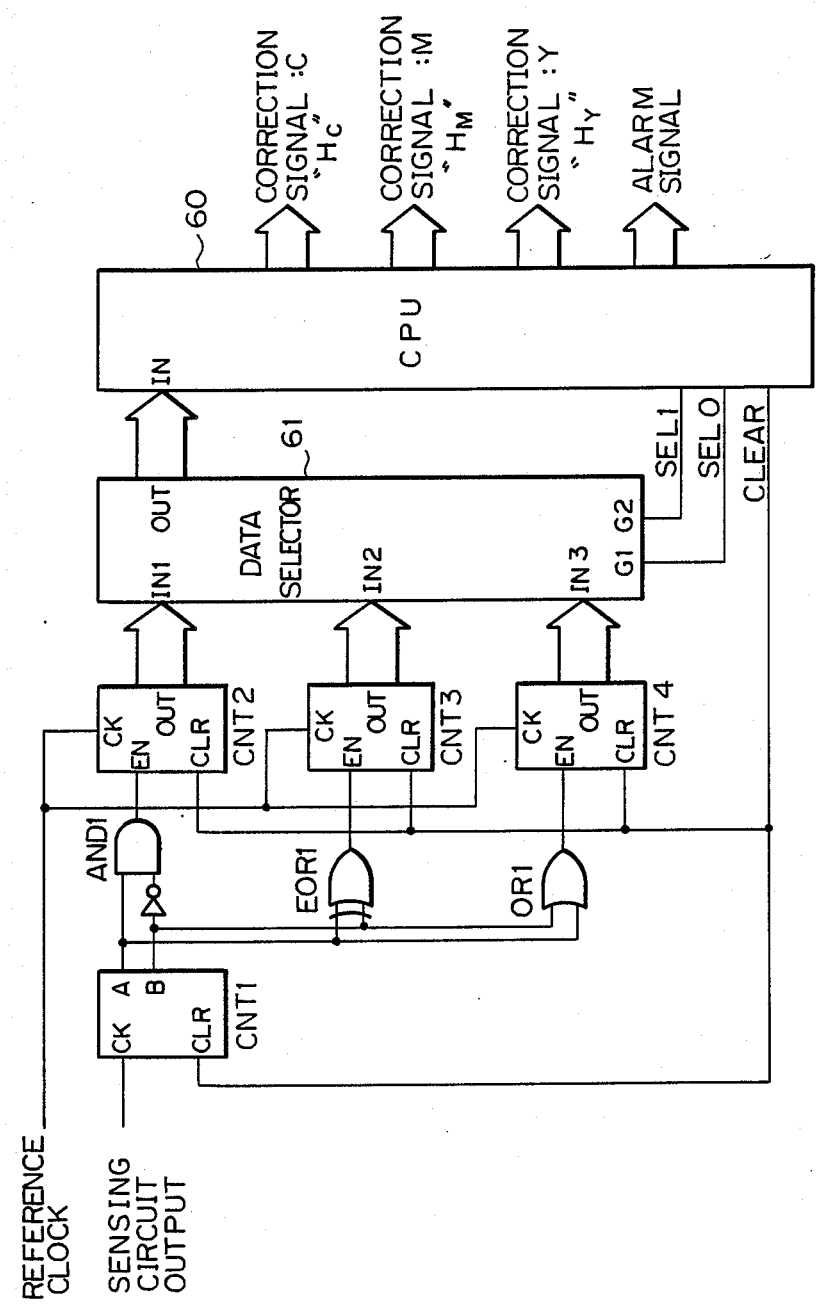
FIG. 21 is a schematic block diagram showing a specific construction of a pattern distance measuring circuit in accordance with the present invention.
Figure 23A:
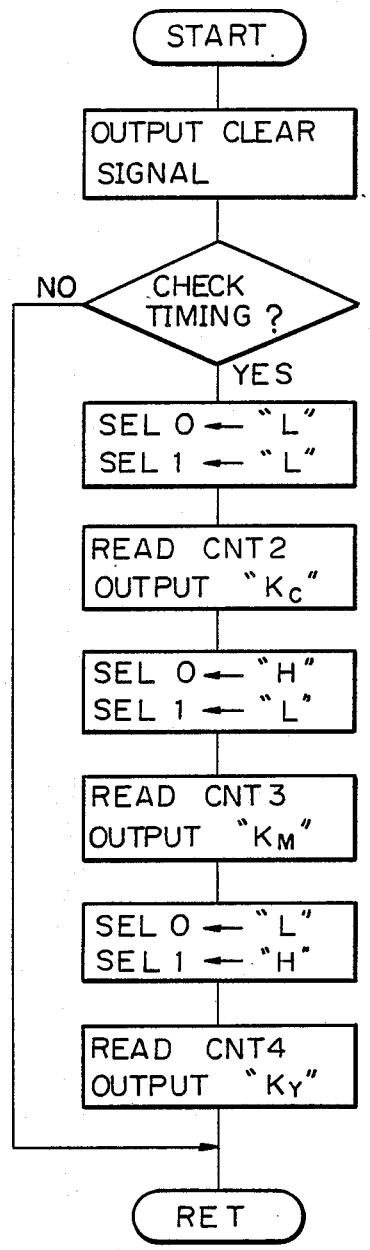
FIGS. 23A and 23B are flowcharts demonstrating the operation of the circuitry shown in FIG. 21.

Referring to FIG. 21, a specific construction of a pattern distance measuring circuit in accordance with the present invention is shown. The operation of this circuit is demonstrated in a timing chart in FIG. 22. Before the measurement of a pattern distance begins, a central processing unit (CPU) clears counters CNT1 to CNT4 by delivering a CLEAR signal thereto. An output of the sensing circuit is fed to a clock terminal of the counter CNT1. Signals shown in FIG. 22 appear on output terminals A and B of the counter CNT1. Signals produced by inverting the outputs A and B of the counter CNT1 are ANDded (AND1) to output a signal which is representative of a distance between the patterns BK and C. A signal representative of a distance between the patterns BK and M is produced by EX-ORing the outputs A and B of the counter CNT1. Further, a signal representative of a distance between the patterns BK and Y is produced by ORing the counter outputs A and B. The signals representative of the distance between the BK and C patterns, the distance between the BK and M patterns, and the distance between the BK and Y patterns are applied to enable inputs of the counters CNT1, CNT2 and CNT3, respectively. While the enable inputs of the counters CNT2, CNT3 and CNT4 each has a high level, the counters CNT2, CNT3 and CNT4 individually count the reference clock pulses to produce bilevel data which are proportional to the distance between the BK and C patterns, the distance between the BK and M patterns, and the distance between the BK and Y patterns, respectively. As the counting operation of each of the counters CNT2, CNT3 and CNT4 ends, the CPU 60 delivers signals SEL0 and SEL1 to a data selector 61 so that the bilevel data outputted by the counters CNT2, CNT3 and CNT4 are sequentially fed to the CPU 60. The procedure described so far is shown in a flowchart in FIG. 23A.

The CPU 60 compares the output of each counter with a reference value to calculate a difference between the reference value and the measured value, producing correction signals C, M and Y for correcting the difference. The correction signals C, M and Y are delivered to the address setting units 45a, 45b and 45c of FIG. 5, respectively. Consequently, the timing for starting writing a BK image is changed to bring images of different colors into register with each other. Assuming that the reference clock pulses have a frequency of F (hertz), the distances $L_C$, $L_M$ and $L_Y$ of the C, M and Y patterns as measured from the BK pattern are expressed as:

$$L_C = (K_C/F) \times v_2 \text{ (millimeter)}$$

$$L_M = (K_M/F) \times v_2 \text{ (millimeter)}$$

$$L_Y = (K_Y/F) \times v_2 \text{ (millimeter)}$$

where $K_C$, $K_M$ and $K_Y$ each is representative of the number of clocks pulses measured.

Hence, deviations $D_C$, $D_M$ and $D_Y$ of the distances of the C, M and Y patterns from their associated reference values are as follows:

$$D_C = L_C - a \text{ (millimeter)}$$

$$D_M = L_M - 2a \text{ (millimeter)}$$

$$D_Y = L_Y - 3a \text{ (millimeter)}$$

By multiplying the deviations $D_C$, $D_M$ and $D_Y$ by a coefficient C which is adapted to convert a deviation into a memory address, the correction signals $H_C$, $H_M$ and $H_Y$ are produced as:

$$H_C = C \times D_C$$

$$H_M = C \times D_M$$

$$H_Y = C \times D_Y$$

Figure 23B:
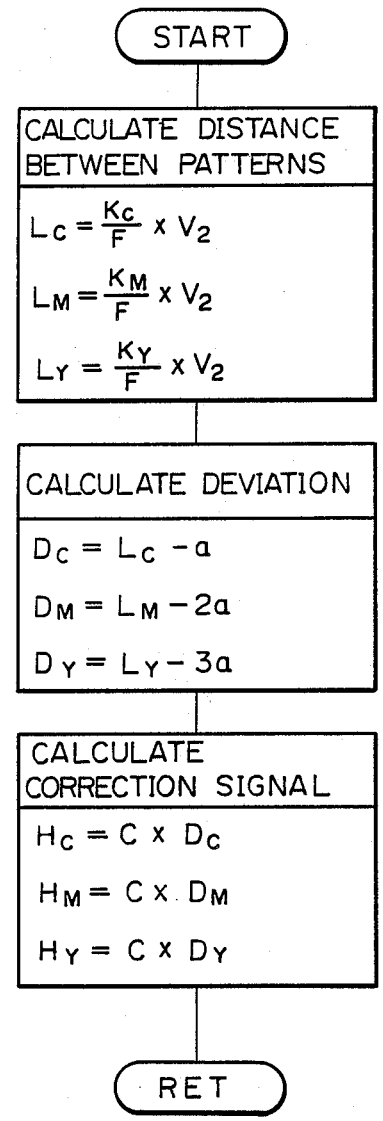

The calculation procedure described above is shown in FIG. 23B.

The specific construction stated above is such that the BK, C, M and Y patterns are produced in this sequence at intervals of a by using the leading edge of each of the images of different colors. It is to be noted that the intervals a are obtainable only if the belt 21 is fed at a designed speed. When the actual belt speed is different from the designed speed due to the scattering among various structural elements, a pattern distance a' (millimeter) is produced by:

$$a' = (v_2'/v_2) \times a$$

where $v_2$ and $v_2'$ are representative of a designed belt speed and an actual belt speed, respectively. Nevertheless, the pattern distance can accurately be measured irrespective of the actual belt speed because the time t for sensing is:

$$t = a'/v_2' = a/v_2$$

Figure 24:
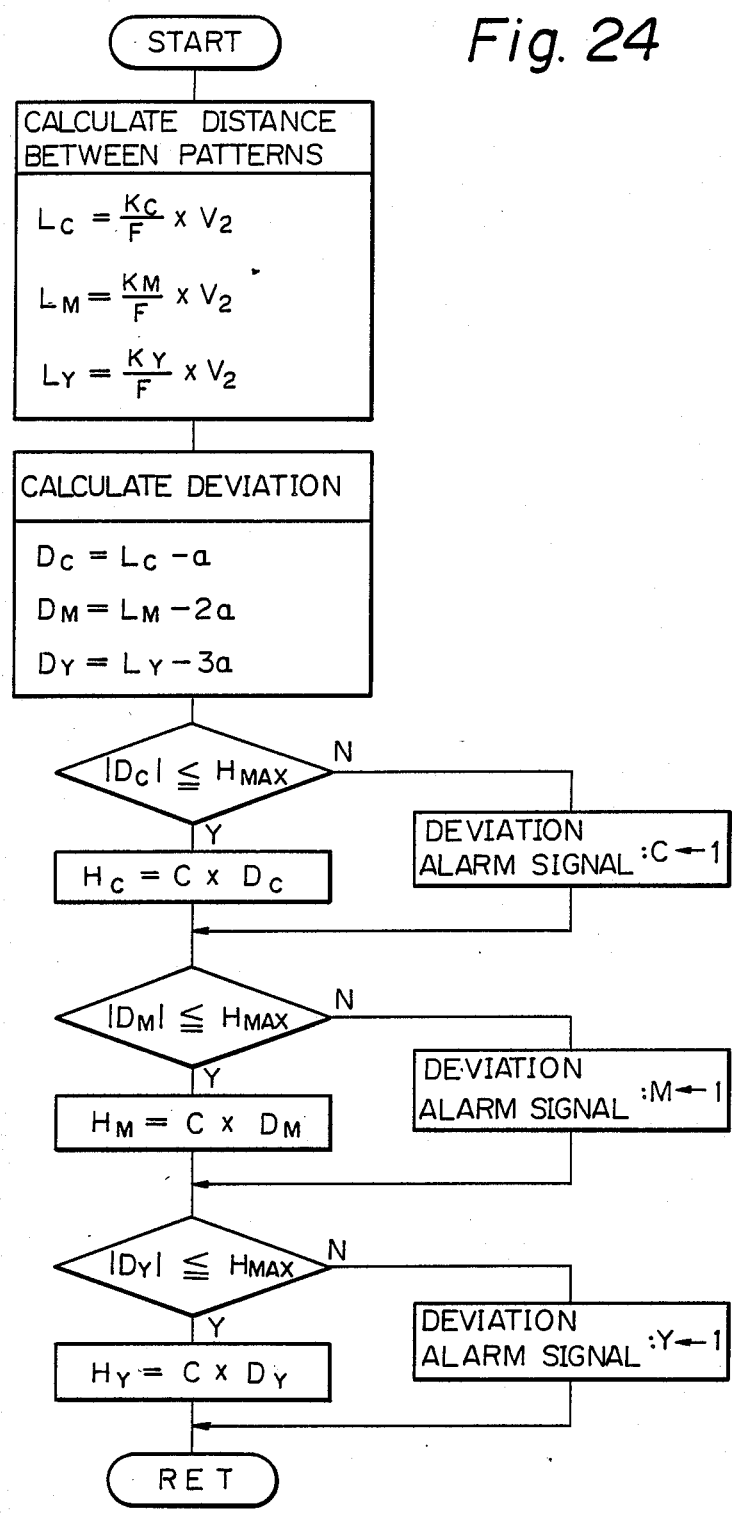
FIG. 24 is a flowchart representative of a color deviation alarm signal control.

Assume that the deviations of the actual pattern distances from their reference values have exceeded a correctable range due to some mechanical failure. Then, a procedure shown in FIG. 24 is executed which is the same as the procedure of FIG. 23B up to calculation of the deviations of the actual distances from their reference values. Subsequently, the absolute values of the deviations of the respective colors are individually compared with a maximum value $H_{max}$ of a correctable range and, if they are smaller than the latter, the correction signals are calculated. If any of the absolute values is greater than the maximum correctable value $H_{max}$, an alarm signal associated with that absolute value is outputted because correction is impossible. The alarm signal is delivered to the control section of the machine body to be used as a signal for inhibiting an image forming operation.

Figure 25:
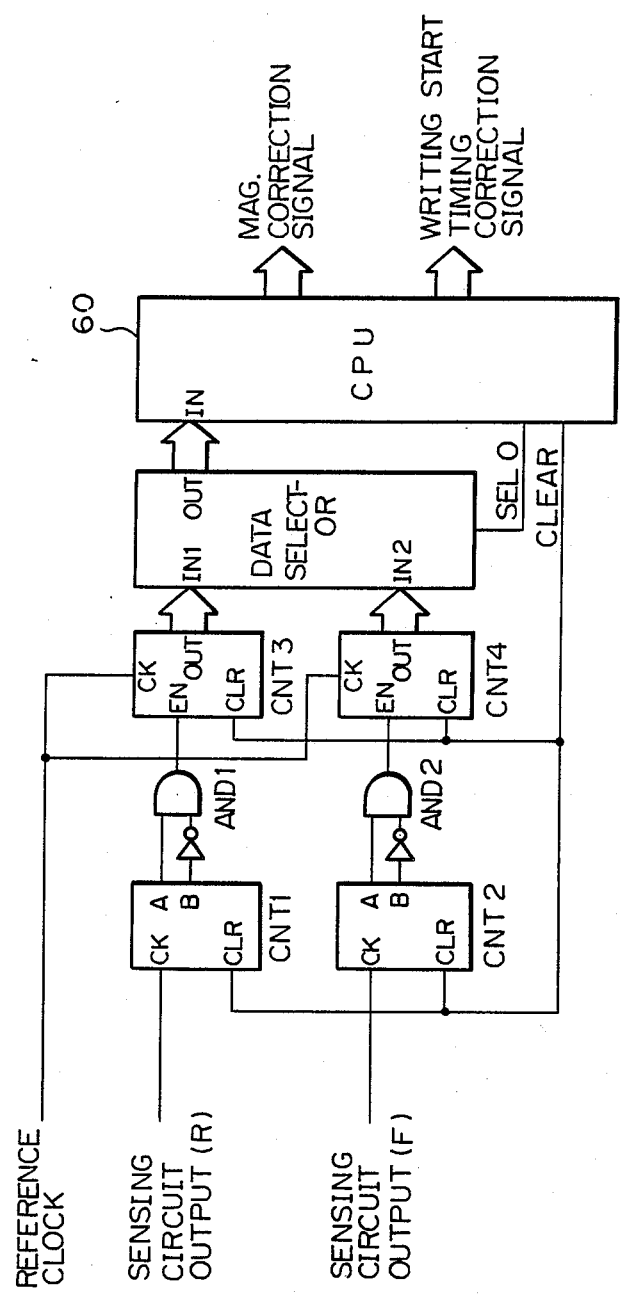
FIG. 25 is a schematic block diagram showing an alternative construction of the pattern distance measuring circuit.
Figure 26:
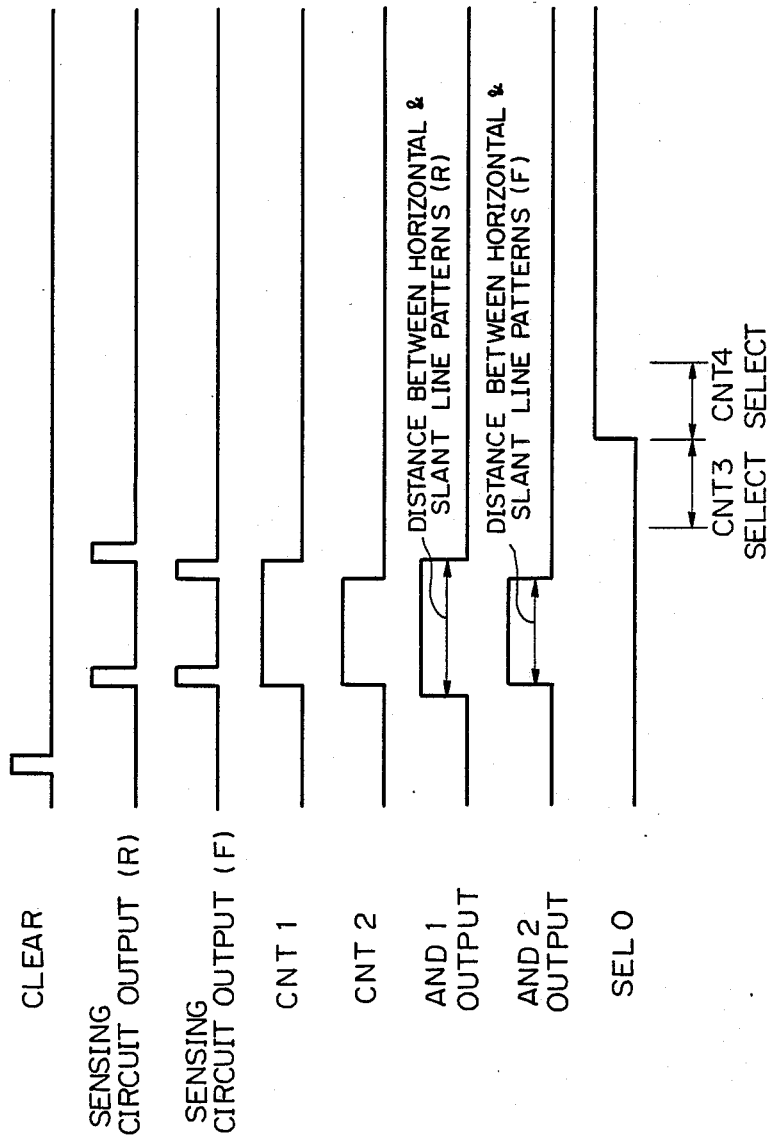
FIG. 26 is a timing chart associated with the circuitry of FIG. 25.

Referring to FIG. 25, another specific construction of the pattern distance measuring circuit is shown. FIG. 26 is a timing chart demonstrating the operation of the circuit of FIG. 25. Before the measurement of a pattern distance begins, the CPU 60 delivers a CLEAR signal to the counters CNT1 to CNT4 to clear them. The sensing circuits (R) and (F) feeds their outputs to the clock terminals of the counters CNT1 and CNT2, respectively. In response, the counters CNT1 and CNT2 produce outputs which are shown in FIG. 26. The outputs A of the counters CNT1 and CNT2 and their inverted versions are ANDed to output signals which are individually representative of the distances of the horizontal and slant line line pattern. As this signal is fed to the enable terminals of the counters CNT3 and CNT4, the counters CNT3 and CNT4 individually count the reference clock pulses while their enable inputs have a high level to thereby produce bilevel data which are proportional to the pattern distances. When counters CNT3 and CNT4 terminate their operations, the CPU 60 delivers a signal SEL0 to the data selector 61 so that the bilevel outputs of the counters CNT3 and CNT4 are sequentially fed to the CPU 60.

Figure 27:
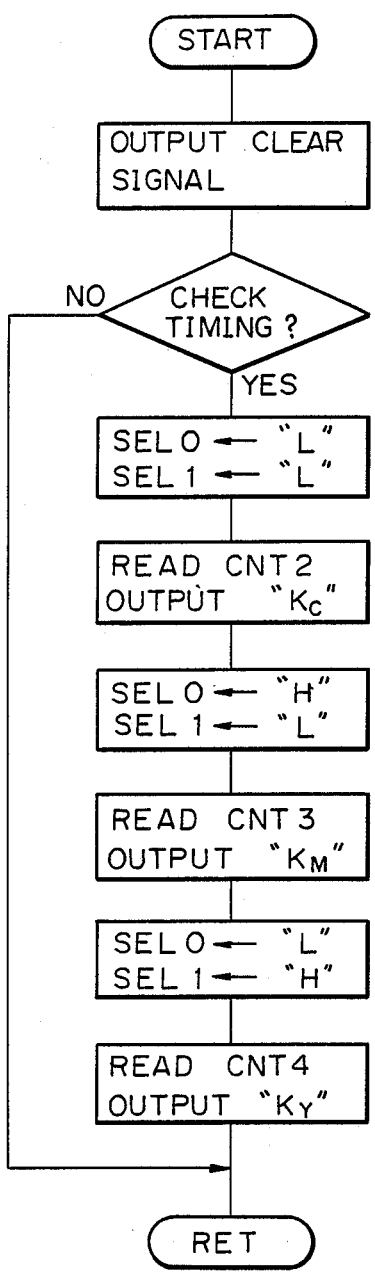
FIG. 27 is a flowchart demonstrating the operation of the circuitry shown in FIG. 25.

FIG. 27 is a flowchart demonstrating the above procedure. As shown, the CPU 60 calculates a difference between the output of each of the counters CNT3 and CNT4 (corresponding to t"pBK(R) and t"pBK(F)) with each of their associated reference values (corresponding to t'pBK(R) and t'pBK(F)), thereby producing correction signals.

Figure 28:
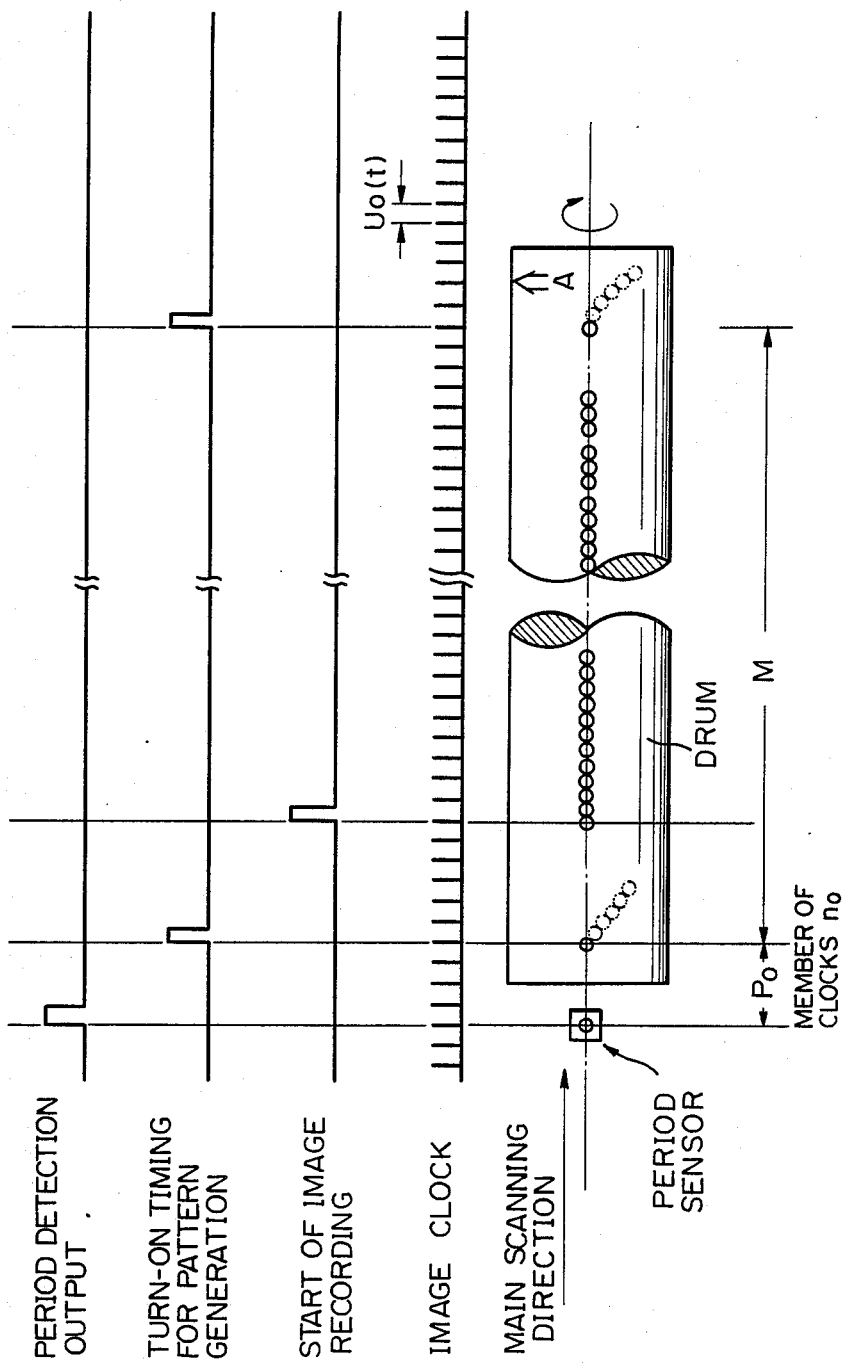
FIG. 28 is a diagram explanatory of how positional deviations in the main scanning direction are corrected.

FIG. 28 shows an exemplary case in which a deviation in a main scanning direction is to be corrected. A laser beam which is manipulated by a polygon mirror causes a synchronization sensor to produce a sinchronizing signal. A pattern generating pulse is outputted as the number of image clock pulses $n_o$ which appear in synchronism with the output of the synchronization sensor are counted, whereby the horizontal and slant line patterns are recorded. Thereafter, an image is recorded in response to an image recording start pulse and then the patterns are recorded on the other side in response to another pattern generating pulse, as shown in FIG. 28. These patterns are developed and then transferred to the belt 21. The two sensors 27(R) and 27(F) shown in FIG. 4 sense the those patterns, and the pattern distances are calculated as demonstrated in FIGS. 11A to 11F. As a result, a deviation of the position (B) of the pattern on the write start side and a magnification M are determined.

To control the actual position (B) and magnitude M to predetermined ones, correction is performed as follows. By using FIGS. 11A to 11F, an actual magnitude M may be expressed relative to a predetermined magnitude $M_o$ as shown below:

$$M = M_o + [t'pBK(R) - t'pBK(R)] + [t'pBK(F) - t''pBK(F)]$$

If the value of reference magnification $M_o$ which is set up at the time of adjustment is stored in a memory, M can be calculated with ease. That the actual magnification M is different from the reference magnification $M_o$ shows that the magnification set up by the laser optics has been changed. To regulate the magnification under such a condition, the image clock pulses $u_o(t)$ are produced as expressed by:

$$u(t) = (M_o/M) \times u_o(t)$$

The correction of the pattern position (B) is executed by determining the number of clock pulses $n_o$ which are derived from the synchronization signal as follows:

$$n = [u_o(t)/u(t)] \times n_o$$

The CPU 60 shown in FIG. 25 delivers signals for correcting the image clock pulses and the number of clock pulses which appear during interval between the detection of synchronization and the occurrence of a pattern generating pulse. A laser optics driver is provided for effecting the correction.

The transfer belt 21 used with the image forming apparatus is implemented by a polyester film which is connected in an endless configuration and, therefore, includes a joint. Since the joint is lower in reflectivity than the other part of the belt 21, it appears in an output signal in the same manner as the patterns 28 due to the use of a reflection type sensor. Should the patterns 28 be transferred to that part of the belt 21 where the joint exists, the pitch of the patterns 28 would fail to be measured with accuracy. Hence, it is necessary to prevent the patterns 28 from being transferred to such a part of the belt 21.

The measurement of the patterns 28 in accordance with the present invention does not have to be performed every time an image is formed, i.e., it suffices to effect it only once at the beginning of a repeat copy mode operation. It follows that controlling the stop position of the joint of the belt 21 at the end of image forming is successful in preventing the patterns 28 from overlapping the joint at the next image forming operation.

Figure 29B:
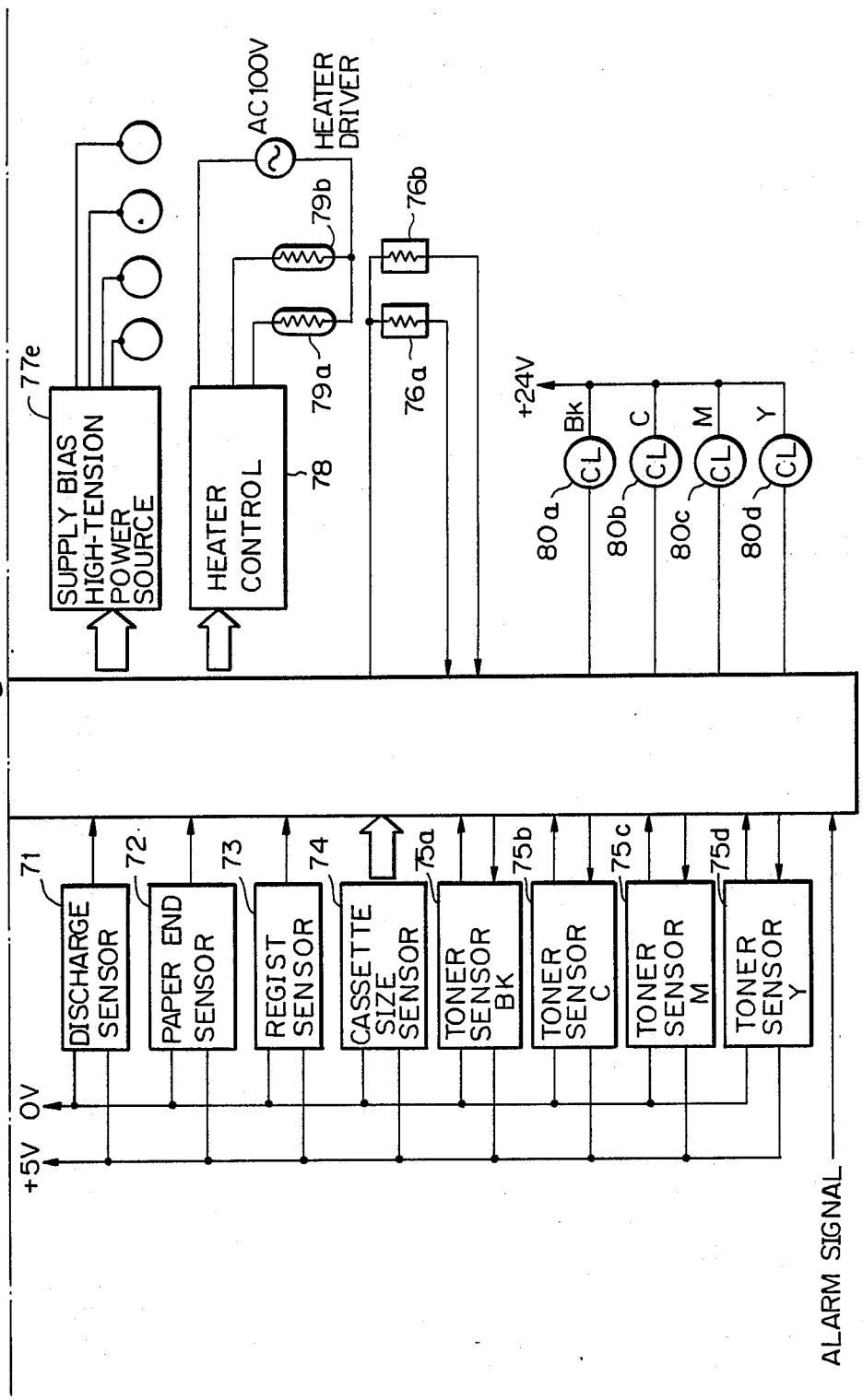

Referring to FIG. 29, a control circuit associated with the printer section 30 is shown. The control circuit includes a main control 70 which is implemented by a CPU, a ROM, a RAM, an input/output (I/O) interface, etc. Connected to the input side of the main control 70 are a discharge sensor 71 responsive to the discharge of a paper to the outside of the copier, a paper end sensor 72 responsive to the presence/absence of papers in any of the paper cassettes, a register sensor 73 for controlling the feed of a paper to the register roller, a cassette size sensor 74 responsive to the size of any of the paper cassettes, toner sensors 75a, 75b, 75c and 75d each being responsive to the concentrations of toner of colors, C, M and Y, and a thermistor 76 responsive to the temperature of a fixing heater 79. Connected to the output side of the main control 70 are a high-tension power source 77 for applying high voltages to various chargers and developing devices, a heater driver 78 for controlling the temperature of the fixing heater 79, a toner supply clutch 80 for supplying toner to any of the developing devices, and a motor driver 81 adapted to control various motors. There are also provided a polygon motor driver 82 for driving the polygon motor, a video control section 84 for controlling LD drivers 83 in response to image data fed from the image processing section, and an interface associated with a system controller.

Positional deviation alarm signals are generated by the CPU of FIG. 21 and applied to the main controller 70. In the illustrative embodiment the color copier is operable in any of various color modes depending upon the recording devices selected. When any of the alarm signals has a high level, the main control 70 selectively permits and inhibits an image forming operation as tabulated below.

| COLOR MODE | RECORDING DEVICE USED | | | ALARM SIGNAL | | |
|---|---|---|---|---|---|---|
| | | | | C"H" | M"H" | Y"H" |
| FULL-COLOR | Y, | M, C, | Bk | X | X | X |
| RED/BLACK | Y, | M, | Bk | O | X | X |
| RED | Y, | M | | O | X | X |
| GREEN | Y | C | | X | O | X |
| BLUE | | M, C | | X | X | O |
| YELLOW | Y | | | O | O | O |
| MAGENTA | | M | | O | O | O |
| CYAN | | C | | O | O | O |
| BLACK | | | Bk | O | O | O |

It is to be noted that circles and crosses of the above table are representative of "permit" and "inhibit", respectively, and that the table does not include BK because it is used as a reference When, for example, the C deviation alarm signal has a high level, a color mode which uses the recording device associated with the color C and combines the color C with another color or colors is inhibited, i.e., those color modes which do not need the recording device associated with C and a single color mode (cyan) are permitted. As for the single color mode which the color C, color deviation does not occur and therefore the resulting copy is fully acceptable. This is also true for M and Y.

With the above construction, the down time of the machine is reduced because not all the image forming modes are inhibited even if the deviation of any of the recording devices becomes greater than a reference value.

Figure 30:
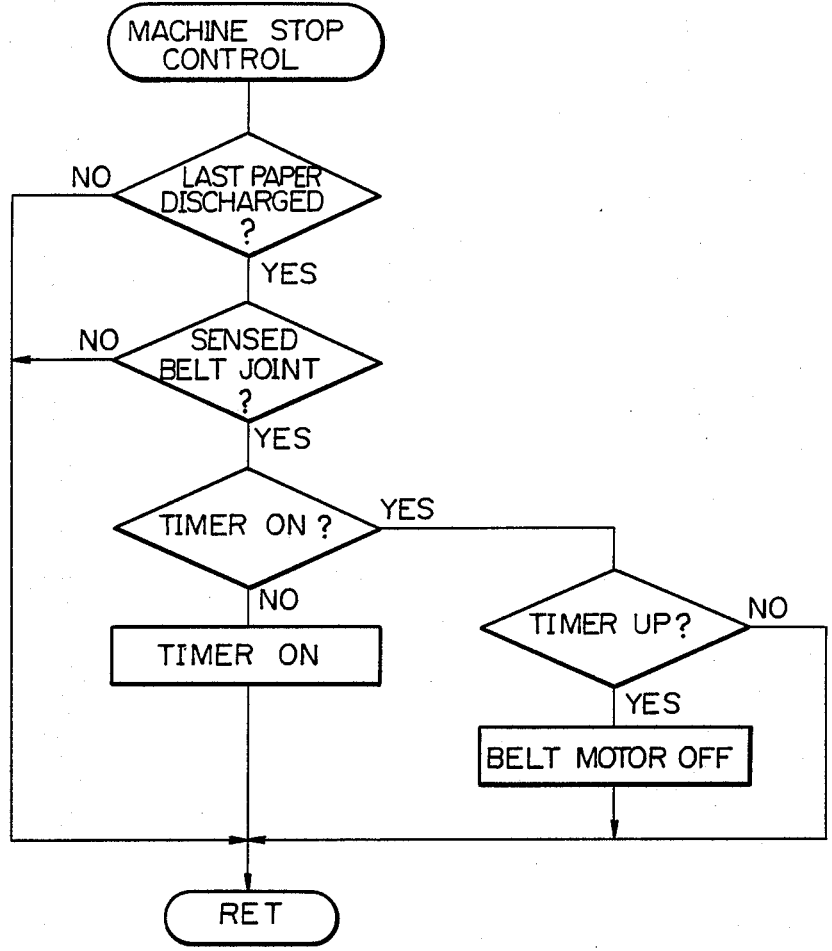
FIG. 30 is a flowchart showing a machine stop control.
Figure 31:
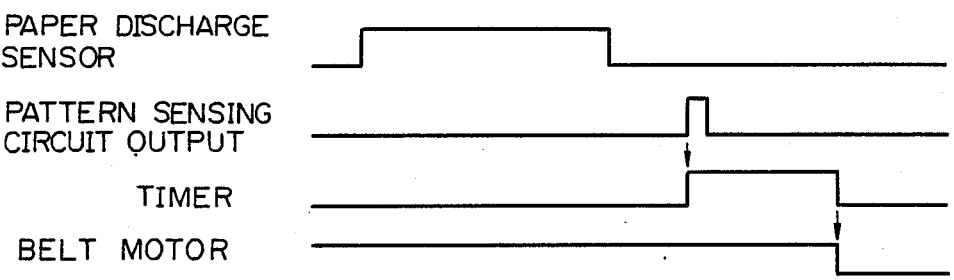
FIG. 31 is a timing chart demonstrating the operation.

The pattern sensing circuit is connected to the main control 70 to cause the latter to control the deactivation of the machine with its output. FIG. 30 is a flowchart demonstrating the control over the deactivation of the machine. As shown, after the discharge sensor 71 has sensed the discharge of the last paper to the outside of the machine in a repeat copy mode, the main control 70 decides that the first output of the pattern sensing circuit is representative of the joint of the belt. Then, the main control 70 starts a timer and, when the timer counts up a predetermined period of time, stops the movement of the transfer belt 21. FIG. 31 is a timing chart associated with the flowchart of FIG. 30. By adequately selecting the predetermined period of time which the timer counts, it is possible to exclude the joint of the belt 21 from the position where the patterns to be sensed will be provided at the beginning of the next image forming operation.

In summary, it will be seen that the present invention provides a color image forming apparatus which accurately measures and compensates for color deviations without being effected by smears on a transport belt and sensor, scattering of sensitivity, etc. The apparatus is free from even the influence of a joint and scratches of a transport belt. In addition, the apparatus suffers from a minimum of down time in the event of a failure.

Various modifications will become possible for those skilled in the art after receiving the teachings of the present disclosure without departing from the scope thereof.

What is claimed is:

1. An image forming apparatus comprising:
   a plurality of recording devices each including a photoconductive element, a charger for uniformly charging a surface of said photoconductive element, exposing means for exposing said photoconductive element to imagewise light, developing means for developing an electrostatic latent image which is provided on said photoconductive element, and transferring means for transferring the developed image from said photoconductive element to a paper;
   said apparatus further comprising:
   pattern image signal generating means for forming pattern images for measurement each being associated with a respective one of a plurality of colors in a part of a surface of said transfer belt outside of a region in which a paper is to be laid;
   single sensing means for sensing arrival of each of the pattern images;
   counting means for counting a timing at which said signal sensing means senses the arrival;
   calculating means for calculating an amount of deviation by comparing a count of said counting means with a predetermined value; and
   timing signal generating means for generating a write start timing signal for each of the colors which is variable on the basis of an output of said calculating means.

2. An apparatus as claimed in claim 1, wherein the pattern images of the respective colors are each generated by using a write start timing associated with the color as a reference, and the pattern to be provided by any of said recording devices is outputted on a downstream side of said transfer belt relative to the pattern to be provided by another of said recording devices which is located downstream of said first-mentioned recording device.

3. An apparatus as claimed in claim 1, wherein peak values of the patterns are detected, and a pitch of the peak values is measured.

4. An apparatus as claimed in claim 1, wherein when the amount of deviation calculated by said calculating means is greater than a predetermined value, an alarm signal is produced and, if an image forming mode which uses two or more of the colors, an image forming operation is inhibited.

5. An image forming apparatus comprising:
   a plurality of recorinng devices each including a photoconductive element, a charger for uniformly charging a surface of said photoconductive element to imagewise light, developing means for developing an electrostatic latent image which is provided on said photoconductive element, and transferring means for transferring the developed image from said photoconductive element to a paper, and a transfer belt having a joint for sequentially transporting a paper to said recording devices to transfer images one upon another;
   said apparatus further comprising:
   pattern image signal generating means for forming pattern images for measurement each being associated with a respective one of a plurality of colors;
   single sensing means for sensing arrival of each of the pattern images;
   counting means for counting a timing at which said signal sensing means the arrival;
   comparing and calculating means for comparing a count of said counting means with a predetermined value and then calculating an amount of deviation as needed;
   timing signal generating means for generating a variable write start timing signal for each of the colors in response to an output of said comparing and calculating means; and
   control means for performing a control such that when said sensing means the joint of said transfer belt, said joint is brought to a predetermined position at the instant when said apparatus stops operating.

6. An apparatus as claimed in claim 5, wherein said sensing means comprises a light emitting portion and a light-sensitive portion, said light emitting portion being turned on only when each of the color pattern images moves past said sensing means.

7. An apparatus as claimed in claim 5, further comprising detecting means for detecting only an AC component of an output signal of said sensing means, amplifying means for amplifying an output of said detecting means, and pulse outputting means for outputting a pulse when an output of said amplifying means is greater than a predetermined value.

8. An apparatus as claimed in claim 5, wherein said control means stops said transfer belt at a position which prevents a transfer position of the pattern images from coinciding with the joint during next image forming operation.

* * * * *